(12) United States Patent
Chinn et al.

(10) Patent No.: US 8,192,524 B2
(45) Date of Patent: Jun. 5, 2012

(54) PROCESS FOR UPGRADING NATURAL GAS WITH IMPROVED MANAGEMENT OF $CO_2$

(75) Inventors: Daniel Chinn, Bay Point, CA (US); Siji Okeowo, Clayton, CA (US); Jeff D. Euhus, Katy, TX (US); Shabbir Husain, San Pablo, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 469 days.

(21) Appl. No.: 12/361,961

(22) Filed: Jan. 29, 2009

(65) Prior Publication Data

US 2010/0186586 A1    Jul. 29, 2010

(51) Int. Cl.
*B01D 53/22*    (2006.01)
*B01D 71/64*    (2006.01)

(52) U.S. Cl. ......... 95/51; 95/45; 95/49; 95/183; 95/187; 96/4; 96/8; 96/9; 96/10; 96/11; 96/12; 96/14

(58) Field of Classification Search ................ 95/45, 49, 95/51, 183, 187, 236; 96/4, 8, 9, 10, 11, 96/12, 13, 14, 243
See application file for complete search history.

(56) References Cited

U.S. PATENT DOCUMENTS

| | | | | |
|---|---|---|---|---|
| 4,130,403 A | * | 12/1978 | Cooley et al. | 95/49 |
| 4,386,944 A | * | 6/1983 | Kimura | 95/51 |
| 4,435,191 A | * | 3/1984 | Graham | 95/51 |
| 4,589,896 A | * | 5/1986 | Chen et al. | 92/28 |
| 4,597,777 A | * | 7/1986 | Graham | 95/51 |
| 5,085,676 A | * | 2/1992 | Ekiner et al. | 96/13 |

(Continued)

FOREIGN PATENT DOCUMENTS

WO    2008/046880 A1    4/2008

(Continued)

OTHER PUBLICATIONS

U.S. Appl. No. 12/007,466, filed Jan. 10, 2008, "Method of Making a High Molecular Weight, Monoesterified Polyimide Polymer".

(Continued)

*Primary Examiner* — Jason M Greene
(74) *Attorney, Agent, or Firm* — Merchant & Gould

(57) ABSTRACT

Disclosed herein are processes for producing a $CO_2$-depleted product gas stream. The processes involve feeding a natural gas feed stream comprising greater than about 10 vol % $CO_2$ to at least one membrane unit comprising a plurality of polymer membranes to provide a $CO_2$-rich permeate comprising at least 95 vol % $CO_2$ and a $CO_2$-depleted product gas stream. The polymer membranes comprise a crosslinked polyimide polymer having covalent ester crosslinks and have a $CO_2$ permeance of at least 20 GPU and a $CO_2/CH_4$ selectivity of greater than 20, at 35 degrees C. and a feed pressure of 100 psia. Also disclosed herein is an apparatus incorporating the crosslinked polyimide polymer for producing a $CO_2$-depleted product gas stream from a natural gas feed stream.

23 Claims, 9 Drawing Sheets

U.S. PATENT DOCUMENTS

| | | | |
|---|---|---|---|
| 5,104,532 A | | 4/1992 | Thompson et al. |
| 5,407,466 A * | | 4/1995 | Lokhandwala et al. .......... 95/51 |
| 5,482,539 A | | 1/1996 | Callahan |
| 6,128,919 A * | | 10/2000 | Daus et al. ......................... 95/51 |
| 6,572,679 B2 * | | 6/2003 | Baker et al. ........................ 95/51 |
| 6,632,266 B2 * | | 10/2003 | Thomas et al. .................... 95/51 |
| 6,755,900 B2 | | 6/2004 | Koros et al. |
| 6,932,859 B2 | | 8/2005 | Koros et al. |
| 7,247,191 B2 * | | 7/2007 | Koros et al. ....................... 96/13 |
| 2009/0165645 A1 * | | 7/2009 | Wind et al. ........................ 95/51 |
| 2011/0009684 A1 * | | 1/2011 | Diaz et al. ...................... 585/818 |

FOREIGN PATENT DOCUMENTS

| | | |
|---|---|---|
| WO | 2009/087155 A1 | 7/2009 |
| WO | 2009/087156 A1 | 7/2009 |

OTHER PUBLICATIONS

U.S. Appl. No. 12/007,467, filed Jan. 10, 2008; Method of Making a Crosslinked Fiber Membrane from a High Molecular Weight, Monoestrified Polyimide Polymer.

Koros and Fleming, Journal of Membrane Science, 83, 1-80 (1993).

Baker, R.W, "Future Directions of Membrane Gas Separation Technology" *Ind. Eng. Chem, Res.*, 41(6):1393-1411 (2002).

Staudt-Bickel, C. and Koros, W.J., "Improvement of CO2/CH4 separation characteristics of polyimides by chemical crosslinking" *Jr. Membrane Sci.* vol. 155:145-154 (1999).

* cited by examiner

PROCESS FOR UPGRADING NATURAL GAS WITH IMPROVED MANAGEMENT OF $CO_2$

FIELD OF ART

The processes and apparatus described herein relate to upgrading natural gas by removing $CO_2$ from the natural gas. More particularly, the processes and apparatus described herein relate to upgrading natural gas by removing $CO_2$ from the natural gas with a polymer membrane comprising a particular crosslinked polyimide polymer to produce a $CO_2$-rich permeate or a $CO_2$-rich product and a $CO_2$-depleted product gas stream.

BACKGROUND

Offshore gas fields in many parts of the world produce natural gas containing a significant amount of carbon dioxide (e.g. greater than 10 vol % $CO_2$). For example, the $CO_2$ content of natural gas streams originating offshore can be as high as 80 vol %.

In contrast, at onshore locations where natural gas is to be used, the natural gas should generally have a relatively low $CO_2$ content. For example, a lower $CO_2$ content corresponds to a higher heating value for the natural gas. $CO_2$ can also lead to freezing in the low-temperature chillers in liquified natural gas (LNG) plants.

There are two main approaches to upgrading natural gas offshore. The first approach involves blending the gas with sufficiently low $CO_2$ gas to reduce the overall $CO_2$ content. The second, alternative approach involves subjecting the gas to some type of $CO_2$ removal process.

Various $CO_2$ removal processes are known in the art. They include absorption processes such as those using an amine solvent solution (e.g. methyl-diethanol amine and water), cryogenic processes, adsorption processes such as pressure swing adsorption (PSA) and thermal swing adsorption (TSA), and membrane-based processes.

Membranes have been utilized for two main $CO_2$ removal applications. The first $CO_2$ removal application is sweetening natural gas. The second $CO_2$ removal application is enhanced oil recovery (EOR). In EOR, natural gas removed from a functioning oil well is subjected to $CO_2$ removal and the $CO_2$ is reinjected into the oil well to enhance oil recovery.

Currently, commercially used membranes for $CO_2$ removal from natural gas are polymer membranes. These polymer membranes include cellulose acetate, polyimides (e.g. Matrimid® available from Huntsman Advanced Materials, Basel, Switzerland), polyamides, polysulfone, polycarbonates, polyetherimide, and perfluoropolymer membranes. Cellulose acetate membranes are the most widely used.

However, these commercially used polymer membranes exhibit limited $CO_2$ permeance and limited $CO_2/CH_4$ selectivity. Due to the limited $CO_2$ permeance, a large number of membrane modules are required when treating large natural gas flow rates with these membranes. Moreover, due to the limited $CO_2/CH_4$ selectivity, a significant amount of methane ends up in the $CO_2$-rich permeate stream when treating natural gas with these membranes. Such slipped methane is particularly unwanted because methane provides significant heating value to natural gas.

The problem of slipped methane has been managed with the methods of venting, flaring, reinjection, and sequestration. However, these coping methods have serious disadvantages when $CO_2$ must be removed from natural gas containing a significant amount of carbon dioxide.

Venting involves releasing the $CO_2$-rich permeate stream to the atmosphere. If currently available polymer membranes, having limited permeance and selectivity, are used to upgrade a 20-35 vol % $CO_2$ natural gas stream to a 8-23 vol % $CO_2$ natural gas stream, they provide a permeate stream having between about 80 vol % and about 90 vol % $CO_2$ and between about 10 vol % and about 20 vol % methane. Venting such a permeate stream is objectionable from an environmental standpoint, especially under active or emerging greenhouse gas (GHG) regulations. Venting such a large amount of methane is particularly objectionable because the GHG value of methane is about 21 times the GHG value of $CO_2$ on a mass basis.

Flaring involves burning off unwanted, flammable gas. Thus, flaring the $CO_2$-rich permeate stream will burn the methane and only release $CO_2$. However, the $CO_2$-rich permeate stream, originating from conventional polymer membranes and containing approximately 80-90 vol % $CO_2$, is typically too lean to flare. Thus, either a portion of the natural gas stream fed to the membrane or the $CO_2$-depleted product gas stream must be blended, as a flare-assist gas, with the $CO_2$-rich permeate. While flaring avoids venting methane as a GHG to the atmosphere, flaring is economically objectionable because a portion of the natural gas fed to the membrane or the $CO_2$-depleted product gas must be diverted from sales for blending. Also, flaring still emits $CO_2$ present in the $CO_2$-rich permeate and $CO_2$ formed from combustion of methane present in the $CO_2$-rich permeate and the flare-assist gas.

Reinjection involves compressing and reinjecting the $CO_2$-rich permeate into an area from which the $CO_2$ in the $CO_2$-rich permeate originated and/or a different area from which the $CO_2$ originated, for example, a different underground formation or strata. For example, reinjection may involve compressing and reinjecting the $CO_2$-rich permeate into a functioning oil well, cyclically, as done during EOR Sequestration involves compressing and reinjecting the $CO_2$-rich permeate permanently into any area, including areas others than the area from which the $CO_2$ in the $CO_2$-rich permeate originated. For example, $CO_2$ may be compressed and sequestered permanently, in a saline aquifer, a depleted oil reservoir, or some other geologic formation, terrestrial formation, or body of water. Problems associated with sequestration and reinjection are related to requisite pressure increase. Both sequestration and reinjection require compression of $CO_2$ and methane to high pressures, which in turn requires significant power. While the $CO_2$-rich permeate can be reinjected as a supercritical fluid that is easily pumpable, due to the 10-20 vol % $CH_4$ present in the $CO_2$-rich permeate, significant pressurization and correspondingly significant power is still required to compress the $CO_2$-rich permeate to a supercritical state.

Therefore, there is a need for a process for producing a $CO_2$-depleted product gas stream from natural gas containing a significant amount of carbon dioxide (e.g. greater than 10 vol % $CO_2$). Such process should require minimal equipment weight and energy and take up minimal space. Moreover, such process should exhibit minimal hydrocarbon losses to the $CO_2$-rich permeate. Accordingly, such process will be useful for upgrading natural gas offshore, will be profitable, and will result in minimal GHG emissions.

SUMMARY

Disclosed herein is a process for producing a $CO_2$-depleted product gas stream, comprising: feeding a natural gas feed stream comprising greater than about 10 vol % $CO_2$ to at least one membrane unit comprising a plurality of polymer membranes to provide a $CO_2$-rich permeate comprising at least 95 vol % $CO_2$ and a $CO_2$-depleted product gas stream, the polymer membranes comprising a crosslinked polyimide polymer having covalent ester crosslinks and having a $CO_2$ permeance of at least 20 GPU and a $CO_2/CH_4$ selectivity of greater than 20, at 35 degrees C. and a feed pressure of 100 psia.

Also disclosed herein is a process for producing a $CO_2$-depleted product gas stream, comprising: feeding a natural gas feed stream comprising greater than about 10 vol % $CO_2$ to at least one membrane unit comprising a plurality of polymer membranes to provide a $CO_2$-rich permeate comprising at least 95 vol % $CO_2$ and a $CO_2$-depleted product gas stream, the polymer membranes comprising a crosslinked polyimide polymer having covalent ester crosslinks and having a $CO_2$ permeance of at least 20 GPU and a $CO_2/CH_4$ selectivity of greater than 20, at 35 degrees C. and a feed pressure of 100 psia; and feeding the $CO_2$-depleted product gas stream to an amine unit to provide a $CO_2$-rich product from the amine unit and a second $CO_2$-depleted product gas stream, wherein the natural gas feed stream originates from a subsea gas reserve and the amine unit is located an onshore location.

Further disclosed herein is an apparatus for producing a $CO_2$-depleted product gas stream from a natural gas feed stream, the apparatus comprising: one or more membrane modules, each membrane module comprising one or more membrane elements and each membrane element comprising a plurality of polymer membranes formed into hollow fibers, the polymer membranes comprising a crosslinked polyimide polymer having covalent ester crosslinks and having a $CO_2$ permeance of at least 20 GPU and a $CO_2/CH_4$ selectivity of greater than 20, at 35 degrees C. and a feed pressure of 100 psia, wherein the hollow fibers have a bore diameter greater than about 25 microns and a fiber length of less than about 15 feet.

Among other factors, the present processes utilizing the particular crosslinked polyimide polymer membranes can require fewer membranes as compared to $CO_2$ removal processes utilizing conventional polymer membranes (e.g. cellulose acetate). Accordingly, the equipment associated with the present processes can weigh less and take up less space than the equipment associated with processes utilizing conventional polymer membranes. These space and weight advantages are advantageous for offshore applications. The present processes can also reduce the amount of slipped methane in the $CO_2$-rich permeate. Decreasing the amount of slipped methane results in a purer $CO_2$-rich stream, which can be vented with lower GHG emissions, reinjected, or sequestered. Decreasing the amount of slipped methane also produces a $CO_2$-depleted product gas stream that is richer in methane and has a higher heating value, which is more valuable.

BRIEF DESCRIPTION OF THE DRAWINGS

FIG. 8 provides an analysis of the effect of fiber bore diameter on $CO_2$ recovery.

DETAILED DESCRIPTION

Definitions

Figure 1:
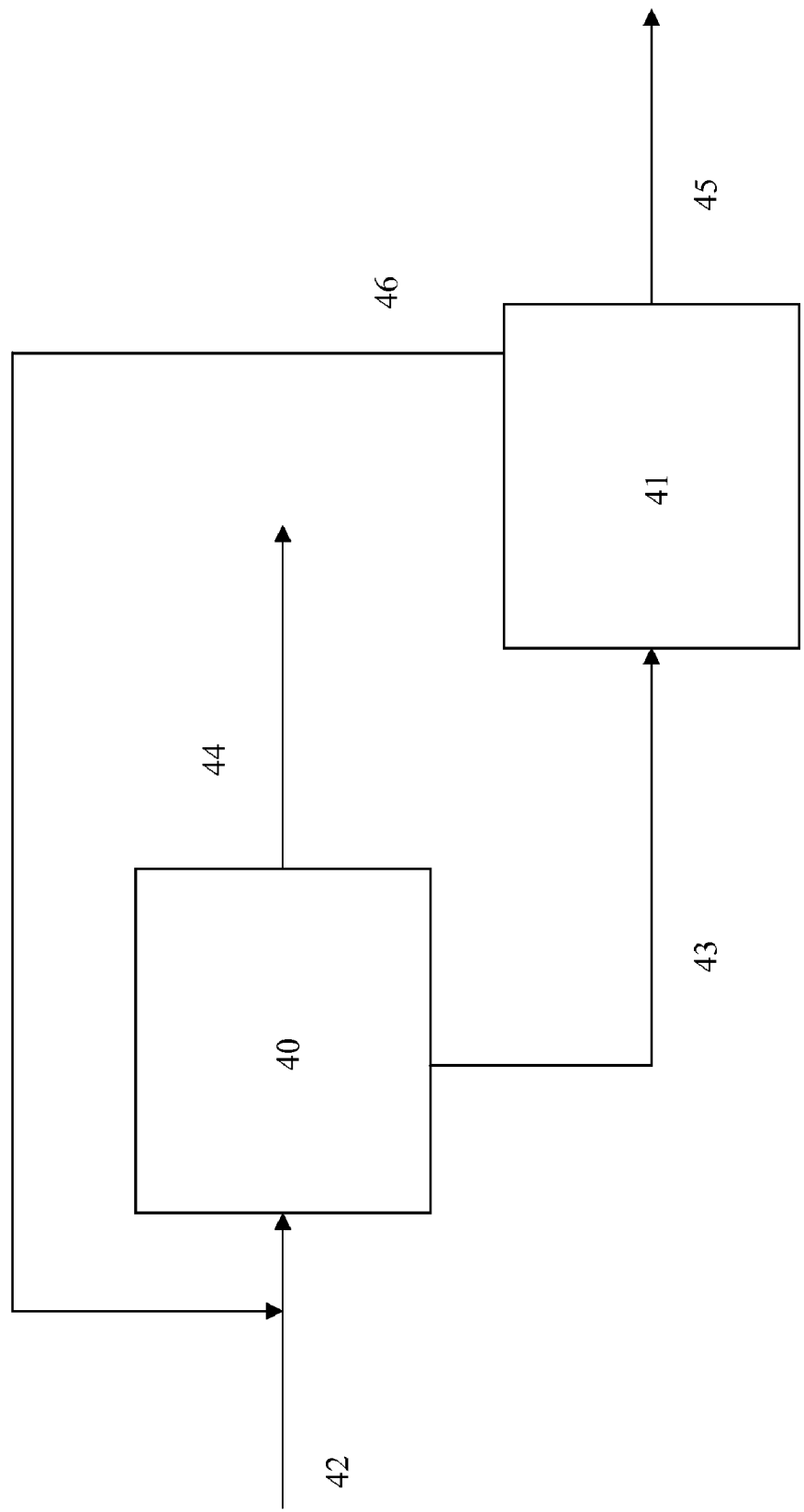
FIG. 1 is a schematic illustration depicting a specific embodiment of the process for producing a $CO_2$-depleted product gas stream, which utilizes a first stage membrane unit and a second stage membrane unit.

The following definitions will be used throughout the specification and will have the following meanings unless otherwise indicated.

As used herein, the term "carboxylic acid functional group" refers to a pendant group of —COOH—.

The term "diol" refers to a chemical compound containing two hydroxyl groups.

The term "carbodiimide" means a chemical compound containing the functional group N═C═N.

The term "dianhydride" refers to any compound that contains two anhydride

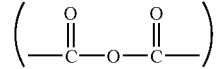

groups.

The term "halogenated alkyl" means a straight-chain or branched saturated monovalent hydrocarbon group of one to twelve carbon atoms, wherein at least one of the carbon atoms is replaced by a halogen atom (e.g. fluoromethyl, 1-bromoethyl, 2-chloro-pentyl, 6-iodo-hexyl, and the like).

The term "halo" or "halogenated" refers to a functional group including a halogen atom such as fluorine, chlorine, bromine, or iodine.

The term "phenyl" means an aromatic group of six carbon atoms having the formula —$C_6H_5$.

The term "alkyl" means a straight-chain or branched saturated monovalent hydrocarbon group of one to twelve carbon atoms (e.g. methyl, ethyl, i-propyl, and the like). Alkyl groups have the formula $C_nH_{2n+1}$ where n is a positive non-zero integer.

The term "diamino cyclic compound" means a chemical compound having a ring structure of three to twelve carbon atoms where the ring structure is functionalized by two amino or substituted amino groups.

The term "amino" means a functional group having the formula —NR'R" where R' and R" are independently H, alkyl, cycloalkyl, and aryl.

The term "cycloalkyl" means a cyclic saturated monovalent hydrocarbon group containing 3 to 12 carbon atoms having a single cyclic ring or multiple condensed rings. Such cycloalkyl groups include, by way of example, cyclopropyl, cyclohexyl, cyclooctyl, adamantanyl, and the like.

The term "amide" means a functional group having a carbonyl group (C=O) linked to a nitrogen atom or a compound that includes this functional group.

The term "ester" means a functional group having a carbonyl group (C=O) linked to an alkoxy group.

The term "alkoxy" refers to an alkyl group linked to an oxygen such as, for example, methoxy (—OCH$_3$) or ethoxy (—OCH$_2$CH$_3$).

The term "aryl" refers to an unsaturated aromatic carbocyclic group of from 6 to 20 carbon atoms having a single ring (e.g., phenyl) or multiple condensed (fused) rings (e.g, naphthyl or anthryl). Exemplary aryls include phenyl, naphthyl and the like.

The term "remote, offshore location" refers to a location that is least 12 nautical miles from land. In one embodiment, the term "remote, offshore location" refers to a location that is at least 200 nautical miles from land.

The term "geologic formation" refers to any underground formation whether natural (e.g. saline aquifers, coal seams) or man-made (e.g. salt domes, depleted wells).

The term "terrestrial formation" refers to any type of land.

The term "amine unit" refers to a facility that removes $CO_2$ from a process stream using an amine solvent. The amine unit causes $CO_2$ from the process stream to move into the amine solvent. Such facilities are well known in the art. An exemplary amine solvent used in such facilities is methyl-diethanol amine.

"GPU" refers to Gas Permeation Unit, which is defined by the following formula:

GPU=[volume of gas passed by the membrane at standard temperature and pressure (cm$^3$)×10$^{-6}$]/[permeating area of the membrane (cm$^2$)×permeation time (s)×partial pressure differences across the membrane (cmHg)]

Process for Producing a $CO_2$-Depleted Product Gas Stream

The process described herein removes $CO_2$ from a natural gas feed stream comprising a significant amount of carbon dioxide to provide a $CO_2$-depleted product gas stream and a $CO_2$-rich permeate. The natural gas feed stream comprises greater than about 10 vol % $CO_2$ and the $CO_2$-rich permeate comprises at least 95 vol % $CO_2$. The process provides the $CO_2$-depleted product gas stream and the $CO_2$-rich permeate by feeding the natural gas feed stream to at least one membrane unit, which includes a plurality of polymer membranes comprising a particular crosslinked polyimide polymer having covalent ester crosslinks. The polymer membranes comprising the particular crosslinked polyimide polymer have a very high $CO_2$ permeance and a very high $CO_2/CH_4$ selectivity. In particular, the polymer membranes comprising the crosslinked polyimide polymer have a $CO_2$ permeance of at least 20 GPU and a $CO_2/CH_4$ selectivity of greater than 20, at 35° C. and a feed pressure of 100 psia.

In one embodiment, the $CO_2$ permeance can be at least 25 GPU and the $CO_2/CH_4$ selectivity can be greater than 25, at 35° C. and a feed pressure of 100 psia. In another embodiment, the $CO_2$ permeance can be at least 25 GPU and the $CO_2/CH_4$ selectivity can be greater than 30, at 35° C. and a feed pressure of 100 psia.

The $CO_2$-rich permeate is generally a waste stream. Accordingly, the $CO_2$-rich permeate may be disposed of in any manner known in the art.

The $CO_2$-depleted product gas stream is generally a stream rich in methane and depleted in $CO_2$. It may be sent directly to a nearby or distant market or undergo additional processing to render it more amenable to transport to a nearby or distant market. Such additional processing is known in the art and can involve transforming the gas into a denser, liquid-like form or highly pressurizing the gas so that it is easier to store and transport. Examples of such additional processing include liquefaction to produce liquefied natural gas (LNG), compression to produce compressed natural gas (CNG), or chemical conversion to other liquid products such as Fischer-Tropsch liquids, methanol, dimethyl ether (DME), etc.

According to the process described herein, the at least one membrane unit is one or more membrane units. Each membrane unit comprises a plurality of polymer membranes comprising the crosslinked polyimide polymer.

Transport of gas molecules across the membranes can be described using a solution and diffusion mechanism, where the gas molecules dissolve at the upstream sides of the membranes, diffuse across the membranes, and exit on the downstream sides of the membranes. Thus, the polymer membranes do not work as filters with pores that separate small molecules from large molecules.

The productivity and efficiency of the membranes in enriching $CO_2$ over the other components of the natural gas feed stream (e.g. methane) can be described by the permeance and selectivity, respectively. Permeance is the pressure normalized flux across the membrane, where flux refers to the rate of movement of $CO_2$ molecules across a unit area of membrane. When the thickness of the dense separating layer is known, the flux can be expressed as a quantity called permeability (P), which is a pressure- and thickness-normalized flux. Selectivity can be defined as the ratio of the permeabilities or permeances of the gas components across the membrane (i.e., $P_A/P_B$ where A and B are the two components). Thus, the efficiency of the membrane in enriching $CO_2$ over $CH_4$ is $P_{CO2}/P_{CH4}$ or $CO_2/CH_4$ selectivity.

$CO_2$ permeability and $CO_2$ selectivity are properties of the membrane material itself, and thus the properties are ideally constant with feed pressure, flow rate and other process conditions. However, $CO_2$ permeability and $CO_2$ selectivity are both temperature-dependent. Permeance is a membrane property and is also dependent on the separation (dense) layer thickness and the permeability of the membrane material.

The removal of $CO_2$ from the natural gas feed stream is achieved by a membrane that permits a faster permeation rate for $CO_2$ (i.e., higher permeance) over the other components of the natural gas feed stream. Accordingly, the polymer membranes comprising the crosslinked polyimide polymer separate $CO_2$ because $CO_2$ dissolves into and diffuses through the crosslinked polyimide polymer at a faster rate than certain other molecules in the natural gas feed stream (e.g. methane).

For $CO_2$ removal, the membrane material should have both a high $CO_2$ permeance and a high $CO_2/CH_4$ selectivity. With higher $CO_2$ permeance, less membrane area is required. With higher $CO_2/CH_4$ selectivity, more $CO_2$ than $CH_4$ arrives in the permeate.

Accordingly, the very high $CO_2$ permeance and the very high $CO_2/CH_4$ selectivity of the crosslinked polyimide polymer membranes are particularly useful in the presently claimed process for producing a $CO_2$-depleted product gas stream.

The $CO_2$ permeance of at least 20 GPU reduces the number of membranes necessary for $CO_2$ separation. As such, the $CO_2$ permeance of at least 20 GPU reduces the weight and footprint of the membranes and their ancillary equipment (e.g. piping, valves, casing, manifolds, etc.). For example, if the crosslinked polyimide polymer membranes are used to retrofit an offshore platform, weight and space allocated to the membranes on the platform will be reduced, which means that additional weight and space may be allocated to other unit operations (e.g. an extra feed gas compressor to boost production, additional utility systems, etc.). As another example, if an offshore platform is designed for new construction, the entire platform (including the topsides and the supporting structure) may be designed to be smaller and less expensive, with plenty of space allocated to other unit operations.

The $CO_2/CH_4$ selectivity of greater than 20 reduces the amount of slipped methane in the $CO_2$-rich permeate stream. As such, the $CO_2/CH_4$ selectivity can provide a permeate stream sufficiently pure in $CO_2$, which may be vented with lower GHG emissions, reinjected, or sequestered. With conventional polymer membranes, such as cellulose acetate membranes, it has not been possible to provide a permeate stream with such $CO_2$ purity when treating a natural gas feed stream having a relatively high $CO_2$ content. In particular, the present inventors have discovered that the crosslinked polyimide polymer membranes can provide a permeate stream comprising at least 95 vol % $CO_2$, which may be vented with lower GHG emissions, reinjected, or sequestered. By providing such a pure $CO_2$-rich permeate stream, the $CO_2$-depleted product stream contains much more of the methane than is possible with other membranes.

Accordingly, in one embodiment of the process disclosed herein, the $CO_2$-rich permeate can be vented to the atmosphere, reinjected, sequestered, or subjected to a combination thereof.

The $CO_2/CH_4$ selectivity of greater than 20 also increases the profitability of the $CO_2$ separation process. Reducing the amount of slipped methane reduces the amount of methane diverted from the product gas stream. Since methane is desired in the product gas stream (e.g. for heating value), the product gas stream can be sold at a higher price.

In one embodiment, the process disclosed herein may further include the step of forwarding the $CO_2$-depleted product gas stream through a pipeline to an onshore location. The at least one membrane unit can be located at either a remote, offshore location or at an onshore location. As such, the $CO_2$-depleted product gas stream may be forwarded through a pipeline from a remote, offshore location to an onshore location. Alternatively, the $CO_2$-depleted product gas stream may be forwarded through a pipeline from one onshore location to another onshore location.

Embodiment with First Stage Membrane Unit and Second Stage Membrane Unit

In one embodiment, the at least one membrane unit comprises a first stage membrane unit and a second stage membrane unit. When the at least one membrane unit is a first stage membrane unit and a second stage membrane unit, an embodiment of the process shown in FIG. 1 may be utilized to provide the $CO_2$-depleted product gas stream and the $CO_2$-rich permeate.

According to this specific embodiment, the natural gas feed stream 42 is fed to the first stage membrane unit 40 to provide a first permeate stream 43 and the $CO_2$-depleted product gas stream 44. The first permeate stream 43 is fed to the second stage membrane unit 41 to provide the $CO_2$-rich permeate 45 and a second retentate stream 46. The second retentate stream 46 combines with the natural gas feed stream 42 before the natural gas feed stream 42 is fed to the first stage membrane unit 40.

In this embodiment, a significant portion of the hydrocarbons (e.g. methane) that permeate through the first stage membrane unit 40 are recovered in the second stage membrane unit 41. These recovered hydrocarbons exit the second stage membrane unit 41 in the second retentate stream 46 and are recycled to the first stage membrane unit 40.

Natural Gas Feed Stream

The $CO_2$ content of the natural gas feed stream may vary. In one embodiment, the natural gas feed stream comprises greater than about 10 vol % $CO_2$. In another embodiment, the natural gas feed stream comprises greater than about 15 vol % $CO_2$. For example, the natural gas feed stream may include between about 15 vol % and about 80 vol % $CO_2$. As another example, the natural gas feed stream may include between about 15 vol % and about 70 vol % $CO_2$. In another embodiment, the natural gas feed stream comprises greater than about 20 vol % $CO_2$. For example, the natural gas feed stream may include between about 25 vol % and about 40 vol % $CO_2$.

Optionally, the polymer membranes can be used to separate other impurity gases, such as $H_2S$, which may be found in the natural gas feed stream. Accordingly, in one embodiment, the natural gas feed stream may also include $H_2S$, which can also be separated by the membranes in the at least one membrane unit. As such, $H_2S$ from the natural gas feed stream may be included in the $CO_2$-rich permeate. This $H_2S$ in the $CO_2$-rich permeate can be further separated from the $CO_2$ and/or reinjected or sequestered. Since $H_2S$, also known as sour gas, is dangerous, it is preferable to further process any $H_2S$ to elemental sulfur by techniques known in the art.

The feed rate of the natural gas feed stream may be adapted to accommodate particular process circumstances and requirements (e.g. the flow rate of the natural gas stream from a particular deposit, the required flow rate of the $CO_2$-depleted product gas stream, etc.). According to one embodiment, the natural gas feed stream is fed to the at least one membrane unit at a flow rate of between about 10 million scf/day and about 1 billion scf/day. According to another embodiment, the natural gas feed stream is fed to the at least one membrane unit at a flow rate of between about 200 million scf/day and about 1 billion scf/day. According to yet another embodiment, the natural gas feed stream is fed to the at least one membrane unit at a flow rate of between about 200 million scf/day and about 800 million scf/day.

$CO_2$-Depleted Product Gas Stream

The $CO_2$ content of the $CO_2$-depleted product gas stream may also vary depending upon process requirements. In one embodiment, the $CO_2$-depleted product gas stream comprises between about 50 ppmv $CO_2$ and about 23 vol % $CO_2$. In another embodiment, the $CO_2$-depleted product gas stream comprises between about 1 vol % $CO_2$ and about 23 vol % $CO_2$. In yet another embodiment, the $CO_2$-depleted product gas stream comprises between about 8 vol % $CO_2$ and about 23 vol % $CO_2$.

Additionally, the hydrocarbon (e.g. methane) content of the $CO_2$-depleted product gas stream may vary. Accordingly, the heating value of the $CO_2$-depleted product gas stream may vary. In one embodiment, the $CO_2$-depleted product gas stream has a heating value between about 300 BTU/scf and about 1200 BTU/scf. In another embodiment, the $CO_2$-depleted product gas stream has a heating value between about 300 BTU/scf and about 1500 BTU/scf. In yet another embodiment, the $CO_2$-depleted product gas stream has a heating value between about 800 BTU/scf and about 1100 BTU/scf.

Preparation of Polymer Membranes Comprising Crosslinked Polyimide Polymer

U.S. Pat. Nos. 6,932,859 and 7,247,191 discuss the preparation of polymer membranes comprising the crosslinked polyimide polymer. U.S. Pat. No. 6,932,859 is directed to a hollow fiber polymer membrane comprising the crosslinked polyimide polymer. U.S. Pat. No. 7,247,191 is directed to a composite polymer membrane comprising the crosslinked polyimide polymer. These patents are herein incorporated by reference in their entirety.

U.S. patent application Ser. Nos. 12/007,466 and 12/007,467 improve upon the preparation process by reducing or eliminating molecular weight loss during the monoesterification reaction of the preparation process. Specifically, utilizing dehydrating conditions during the monoesterification reaction reduces or eliminates molecular weight loss. These patent applications are also herein incorporated by reference in their entirety.

Making the polymer membranes comprising the crosslinked polyimide polymer first involves a polymerization reaction and an imidization reaction. The polymerization and imidization reaction form a polyimide polymer. Making the polymer membranes comprising the crosslinked polyimide polymer next involves a monoesterification reaction to form a monoesterified polyimide polymer. The monoesterified polyimide polymer is then formed into hollow fibers or cast to form flat sheets. Subsequently, the monoesterified polyimide polymer is subjected to a transesterification reaction to form crosslinked polyimide polymer.

Polymerization and Imidization Reactions

The polymerization reaction prepares a polyimide polymer comprising carboxylic acid functional groups. The polymerization reaction involves combining monomers and at least one solvent such that the monomers dissolve in the solvent to form a reaction solution. Thereafter, the monomers polymerize through the formation of amide bonds to provide a polyamide polymer.

The imidization reaction prepares a polyimide polymer comprising carboxylic acid functional groups. During the imidization reaction, the amide bonds of the polyamide polymer are converted to imide rings.

With regard to the polymerization reaction, it is important that at least some of the monomers include carboxylic acid functional groups such that the resultant polyimide polymer comprises carboxylic acid functional groups. The monomers can include dianhydrides, tetracarboxylic acids, and furandiones. The monomers can further include diamino compounds such as diamino cyclic compounds and diamino aromatics. Such diamino aromatics can have more than one aromatic ring where the amino groups are on the same or different aromatic ring.

For example, the monomers can include monomers A, B, and C wherein A is a dianhydride of the formula:

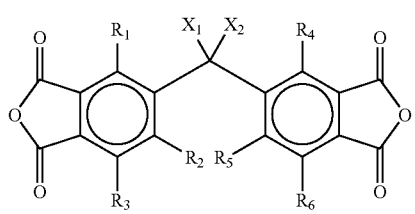

$X_1$ and $X_2$ are the same or different halogenated alkyl, phenyl or halogen;
$R_1$, $R_2$, $R_3$, $R_4$, $R_5$, and $R_6$ are H, alkyl, or halogen;

B is a diamino cyclic compound without a carboxylic acid functionality; and

C is a diamino cyclic compound with a carboxylic acid functionality.

If the monomers are comprised of the monomers A, B, and C, the ratio of B to C can be between 1:4 and 8:1. Alternatively, the ratio of B to C can be between 17:3 and 3:2. As another alternative, the ratio of B to C can be between 17:3 and 3:1. As yet another alternative, the ratio of B to C can be between 4:1 and 3:2.

The monomer A can be 4,4'-(hexafluoroisopropylidene) diphthalic anhydride (6FDA), which is also known as (2,2-bis(3,4-dicarboxylphenyl)hexafluoropropane. 6FDA has the following formula:

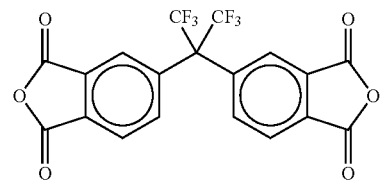

Including 6FDA in the monomers provides stability to the polyimide polymer because 6FDA has limited rotational ability.

Monomers with limited rotational ability, like 6FDA, are desirable because they increase the selectivity of the membrane. Monomers with bulky side groups, like $(CF_3)_2$ in 6FDA, also inhibit chain packing, which increases permeability of molecules through the membrane. As discussed above, both selectivity and permeability are important for efficient and productive separations. Further reference to these structure property relationships can be found in Koros and Fleming, *Journal of Membrane Science*, 83, 1-80 (1993), herein incorporated by reference in its entirety.

The monomer B, a diamino cyclic compound without a carboxylic acid functionality, can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenzene, or tetramethyldiaminobenzene. The monomer B can also be 2,4,6-trimethyl-m-phenylenediamine (DAM), which is represented by the following formula:

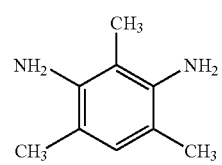

The monomer C, a diamino cyclic compound with a carboxylic acid functionality, can be diamino benzoic acid. It is represented by the following formula:

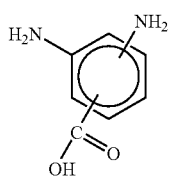

More specifically, the monomer C can be 3,5 diaminobenzoic acid (DABA).

In one embodiment, the monomers include A, B, and C where A is 6FDA, B is DAM, and C is DABA. In this embodiment, the 6FDA content of the monomer mixture is about 50 percent and the remaining about 50 percent of the monomer mixture is composed of DAM and DABA. The DABA content is between about 20 percent and about 100 percent of the remaining about 50 weight percent. For example, the 6FDA content of the monomer mixture can be about 50 percent and the remaining about 50 percent can be about 40 percent DABA and about 60 percent DAM. When 6FDA, DAM, and DABA are present in these stoichiometric concentrations, the resulting polyimide polymer is represented by the formula:

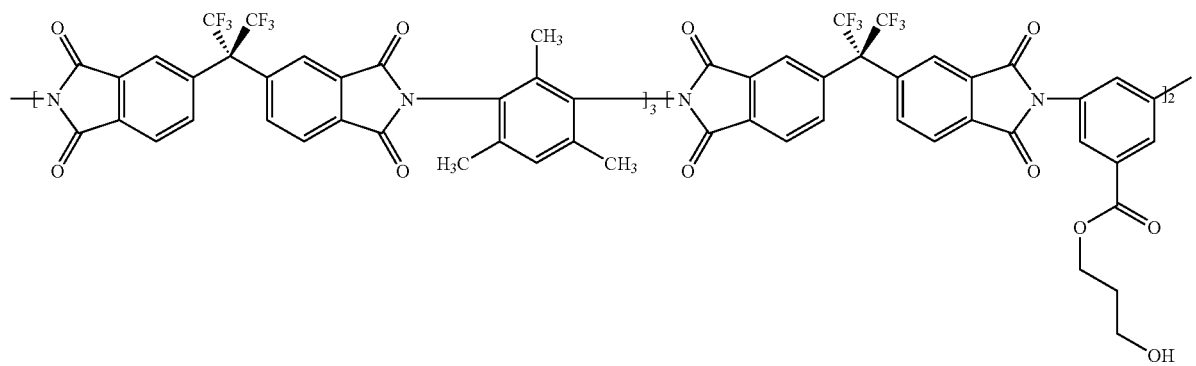

In another embodiment, the monomers include A, B, and C, where A is 6FDA, B is DAM, and C is DABA as well as one or more additional dianhydrides.

Regardless of the monomers used, they can be purified by techniques known in the art, for example, sublimation or recrystallization.

The monomers are dissolved in at least one solvent to create a reaction solution and facilitate polymerization. The at least one solvent can comprise between about 75 and about 95 weight percent of the reaction solution. The at least one solvent can be at least one high boiling organic solvent. The solvent can also be mixtures of organic solvents. Exemplary high boiling organic solvents are listed in Table 1 along with their normal boiling points.

TABLE 1

| High boiling organic solvent | Normal boiling point (° C.) |
| --- | --- |
| N-Methyl-2-pyrrolidione (NMP) | 202.1 |
| Dimethyl sulfoxide (DMSO) | 190 |
| Dimethylformamide (DMF) | 152.9 |
| Dimethylacetamide (DMAc) | 165.1 |
| Diglyme | 162 |

Accordingly, the solvent of the reaction solution can be any one of the organic solvents listed above or mixtures thereof. High boiling solvents are desirable because they prevent excessive evaporation, which would significantly alter concentrations in the reaction solution and concentrations during subsequent processing.

Polymerization can occur at room temperature while the reaction solution is stirred or otherwise agitated. Solvent concentration during polymerization can be between about 75 and about 95 weight percent of the reaction solution. The monomers can comprise between about 15 and about 25 weight percent of the reaction solution.

The resulting polyamide polymer remains in the reaction solution for imidization. In the imidization reaction, the amide bonds of the polyamide polymer form imide rings to provide the polyimide polymer. The imidization reaction occurs over an extended period of time, approximately 12-36 hours. Such an extended period of time ensures that the imidization reaction proceeds to completion, which is important with respect to yield of the polyimide polymer. The imidization reaction can occur at temperatures between about 160° C. and about 200° C. Solvent concentration during imidization can be between about 75 and about 95 weight percent of the reaction solution.

The imidization reaction can take place under dehydrating conditions. Water is produced as a by-product during the imidization reaction. Such dehydrating conditions at least partially remove this water by-product from the reaction solution. It is desirable to remove water produced during the imidization reaction because it can degrade the imide rings of the polyimide polymer during the subsequent monoesterification reaction. This residual imidization water can also cause chain scissioning of the polyimide polymer. While the polyimide polymer could be precipitated out of the reaction solution as in conventional processes and then subjected to monoesterification, including dehydrating conditions during the imidization reaction makes such a precipitation step unnecessary and the entire reaction can be a "one-pot" synthesis.

If dehydrating conditions are utilized during the imidization reaction to remove water, the concentration of water in the reaction solution can be maintained at between about 0 weight percent and about 0.26 weight percent.

The dehydrating conditions can be the presence of a chemical dehydrating agent and/or a mechanical dehydrating agent. The dehydrating conditions can be the presence of a chemical dehydrating agent only, a mechanical dehydrating agent only, or the combination of a chemical dehydrating agent and a mechanical dehydrating agent.

If a chemical dehydrating agent is utilized, the chemical dehydrating agent does not impede the imidization reaction. For example, it does not decrease the imidization reaction rate or decrease the monoesterified, polyimide polymer yield. The chemical dehydrating agent can form an azeotrope with water, which can be boiled out of the reaction solution. Such azeotropic chemical dehydrating agents are well known to one of ordinary skill in the art. Exemplary azeotropic chemical dehydrating agents include ortho-dichlorobenzene (ODCB), benzene, toluene, and mixtures thereof. Alternatively, the chemical dehydrating agent can be a carbodiimide.

If an azeotropic chemical dehydrating agent is used as the chemical dehydrating agent, it can be used in relatively large amounts, for example, between about 1 ml and about 4 ml per gram of the polyamide polymer. Such a large amount of azeotropic chemical dehydrating agent ensures that the water produced by the imidization reaction is removed from the reaction solution.

If a carbodiimide is used as the chemical dehydrating agent, it can be used in an amount between about 1 and about 4 times the stoichiometric amount based on moles of water removed.

The chemical dehydrating agent can also be periodically added to the reaction solution. For example, ODCB can be added periodically. According to one embodiment, the chemical dehydrating agent is added to the reaction solution in three separate batches.

If a mechanical dehydrating agent is utilized, the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the reaction solution from returning to the reaction solution is suitable.

Monoesterification Reaction

The monoesterification reaction involves treating the polyimide polymer with a diol at esterification conditions in the presence of dehydrating conditions to form a monoesterified polyimide polymer. After the imidization reaction is complete, the reaction solution comprises the polyimide polymer, the at least one solvent, and any unreacted monomers. The diol can be directed added to the reaction solution as a crosslinking agent to form a monoesterification reaction solution. Thus, both the imidization reaction and the monoesterification reaction can take place in one reaction vessel or "one pot." Alternatively, the polyimide polymer can be isolated and then combined with the diol to form a monoesterification reaction solution such that the imidization reaction and the monoesterification reaction take place in separate reaction vessels.

The monoesterification reaction involves the following reaction scheme:

polyimide polymer to convert the —COOH groups to esters and provide the monoesterified polyimide polymer. Water is also produced as a by-product during monoesterification. Importantly, at least a portion of the water is removed from the monoesterification reaction solution by the dehydrating conditions.

The length of the diol is an important consideration. If the diol is too long or too short, it can decrease the permeability and/or selectivity of a membrane formed from the mono esterified, polyimide polymer.

Useful diols include ethylene glycol, propylene glycol, 1,3 propanediol, 1,4 butanediol, 1,2 butanediol, benzenedimethanol, 1,3 butanediol, and mixtures thereof. In one embodiment, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3, propanediol, and mixtures thereof. In yet another embodiment, the diol is selected from the group consisting of ethylene glycol, 1,3, propanediol, and mixtures thereof. In still another embodiment, the diol is 1,3 propanediol.

As with the optional dehydrating conditions of the imidization reaction, the dehydrating conditions of the monoesterification reaction can result from a chemical dehydrating agent and/or a mechanical dehydrating agent. Therefore, the dehydrating conditions can be a chemical dehydrating agent alone, a mechanical dehydrating agent alone, or the combination of a chemical dehydrating agent and a mechanical dehydrating agent. It is desirable that the dehydrating conditions, whether chemical or mechanical, remove water produced during the monoesterification reaction from the monoesterification reaction solution such that the concentration of water in the monoesterification reaction solution is maintained at between about 0 weight percent and about 0.08 weight percent.

If a chemical dehydrating agent is utilized, the chemical dehydrating agent does not impede the monoesterification reaction. For example, it does not decrease the monoesterification reaction rate or decrease the monoesterified, polyimide polymer yield. The chemical dehydrating agent can be an azeotropic chemical dehydrating agent or can be a carbodiimide. An azeotropic chemical dehydrating agent forms an azeotrope with the water by-product, which can be boiled out of the monoesterification reaction solution. Such azeotropic chemical dehydrating agents are well known to those of ordinary skill in the art and include ODCB, benzene, toluene, and mixtures thereof.

A carbodiimide functions as a chemical dehydrating agent by participating in the monoesterification reaction by activat-

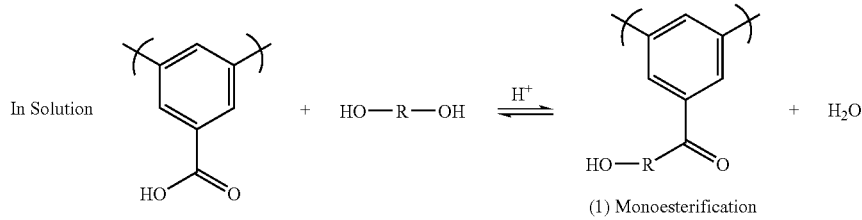

(1) Monoesterification

During monoesterification, one of the —OH groups in the diol molecules reacting with the —COOH groups of the ing the carboxylic acid functionality of the polyimide polymer toward ester formation and thereby eliminating the water by-product at the same time. This carbodiimide dehydration reaction mechanism is depicted below.

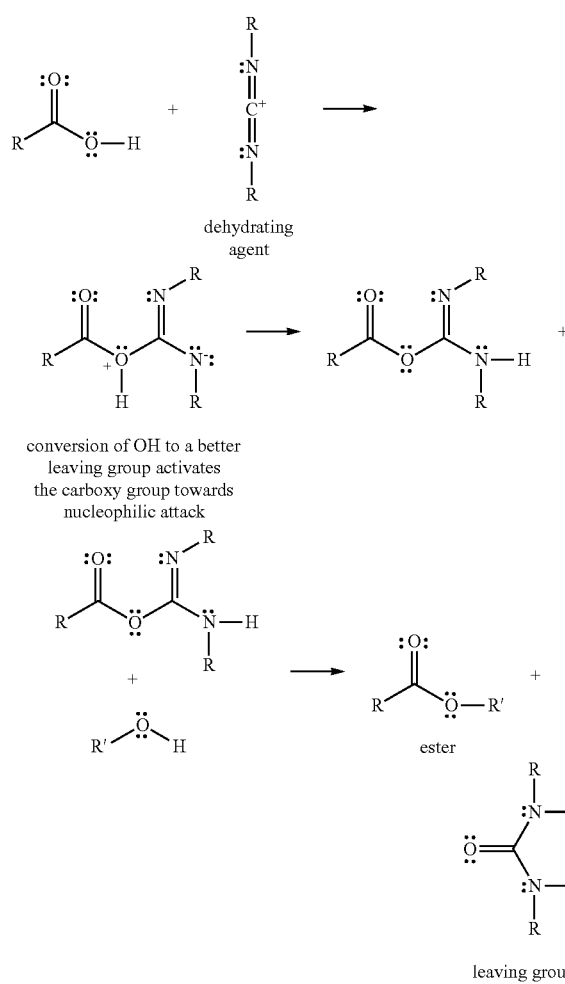

If an azeotropic chemical dehydrating agent is used as the chemical dehydrating agent, it can be used in relatively large amounts, for example, between about 1 ml and about 4 ml per gram polyimide polymer. Such a large amount of azeotropic chemical dehydrating agent ensures that the water produced by the monoesterification reaction is removed from the monoesterification reaction solution.

If a carbodiimide is used as the chemical dehydrating agent, it can be used in an amount between about 1 and about 4 times the stoichiometric amount based on the moles of water removed.

The chemical dehydrating agent can also be periodically added to the monoesterification reaction solution throughout the monoesterification reaction. For example, ODCB can be added periodically. According to one embodiment, the chemical dehydrating agent is added to the monoesterification reaction solution in three separate batches.

As in the imidization reaction, the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the monoesterification reaction solution from returning to the monoesterification reaction solution is suitable.

If dehydrating conditions are utilized during the imidization reaction, the dehydrating conditions of the monoesterification reaction can be the same as the dehydrating conditions of the imidization reaction. In fact, it is desirable for the dehydrating conditions to be the same because this simplifies the overall synthesis. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction can be employed in the monoesterification reaction.

Along with the diol, an acid catalyst can also be added to the reaction solution to facilitate the monoesterification reaction.

Acid catalysts useful in monoesterification reactions are well known to those of skill in the art. Acid catalysts activate the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which document is incorporated by reference in its entirety herein. Exemplary acid catalysts include para-toluene sulfonic acid, sulfuric acid, methanesulfonic acid, triflic acid, and mixtures thereof. If the dehydrating conditions utilized include a carbodiimide, acid catalyst may not be necessary because the carboxyl functional group of the polyimide polymer is activated by the carbodiimide.

The amount of acid catalyst present during the monoesterification reaction, under dehydrating conditions, also affects the average molecular weight of the monoesterified, polyimide polymer. More particularly, when the amount of acid catalyst used is less than the conventional amount and dehydrating conditions are present, significantly less molecular weight loss, no molecular weight loss, or even molecular weight gain, occurs. While not wishing to be bound by any particular theory, it is believed that excess acid catalyst augments degradation of the imide rings of the polyimide polymer, which causes undesirable chain scissioning and loss of average molecular weight. If DABA monomers are used, the amount of acid catalyst can be further reduced from the conventional amount. This is due to the fact that DABA monomers are intrinsically acidic.

Between about 0 milligrams and about 0.25 milligrams of acid catalyst can be added to the monoesterification reaction solution per gram of polyimide polymer without experiencing undesirable molecular weight loss.

In the monoesterification reaction, the monoesterification reaction solution, with or without catalyst, is heated to a relatively high temperature over an extended period of time. Generally, the monoesterification reaction solution is heated for approximately 12-30 hours at a temperature between about 120° C. and about 140° C.

In small (volume) scale reactions, the dehydrating conditions can remove water more easily than in large (volume) scale reactions because the surface area to volume ratio of the reaction vessel is higher. Such a higher ratio facilitates boiling of the water.

If large (volume) scale reactions, it is advantageous for both the imidization reaction and the monoesterification reaction to occur in the same reaction vessel. Then any dehydrating conditions remaining from the imidization reaction can be easily utilized during the monoesterification reaction.

Forming Monoesterified Polyimide Polymer Membranes

The forming step can involve forming the monoesterified polyimide polymer into membranes.

The membranes can be in the form of hollow fibers or flat sheets. Methods of spinning hollow fibers and casting flat sheets are well known in the art. Exemplary spinning methods include wet-quench/dry-jet spinning and wet spinning A useful wet-quench/dry-jet spinning process is disclosed in U.S. patent application Ser. No. 12/007,467, which is incorporated in its entirety herein.

The membranes made from the high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes. The high molecular weight, monoesterified polyimide polymer as disclosed herein can also be cast to form sheets or films. The sheets or films can be self-supporting or be cast onto a suitable support to provide a composite sheet. The sheets and films can be cast onto a sheet of another polymer. This polymer support can be a porous and low cost polymer. As such, this porous polymer can be used as a support for a less porous sheet or film formed from the high molecular weight, monoesterified polyimide polymer as disclosed herein.

Transesterification Reaction

To crosslink the monoesterified polyimide polymer in the membranes, the monoesterified polyimide polymer is subjected to a transesterification reaction. The transesterification reaction involves subjecting the monoesterified polyimide membrane to transesterification conditions to form a crosslinked membrane.

The transesterification reaction involves the following reaction scheme:

membrane is heated to crosslink at a temperature of about 180° C. or higher under vacuum. In another embodiment, the monoesterified, polyimide membrane is heated to crosslink at a temperature of about 200° C. or higher under vacuum. For example, the monoesterified polyimide membrane can be heated under vacuum at 200° C. for approximately 2 hours and cooled under vacuum for approximately 6 hours. Higher temperatures generally result in a greater degree of crosslinking.

Transesterification can also be accomplished by UV or microwave treatment. Furthermore, transesterification reactions can be catalyzed. Transesterification catalysts can be the same acid catalysts used during monoesterification, which include para-toluene sulfonic acid, sulfuric acid, methanesulfonic acid, triflic acid, and mixtures thereof.

The at Least One Membrane Unit

As described above, the at least one membrane unit includes a plurality of polymer membranes. The plurality of polymer membranes can be manufactured into one or more membrane elements. As discussed above, the polymer membranes comprising the crosslinked polyimide polymer may be in the form of hollow fibers or flat sheets. Accordingly, exemplary membrane elements are hollow fiber membrane elements, which are manufactured from hollow fibers, and spiral wound membrane elements, which are manufactured from flat sheets. Another exemplary membrane element is a flat stack permeator.

Once the polymer membranes are formed into membrane elements, the membrane elements are typically assembled into modules. For example, multiple hollow fiber membrane elements may be joined together and inserted into a pressure vessel, typically but not restricted to a cylindrical tube. This pressure vessel with its interior membrane elements is a membrane module. In a case where the feed is introduced bore side

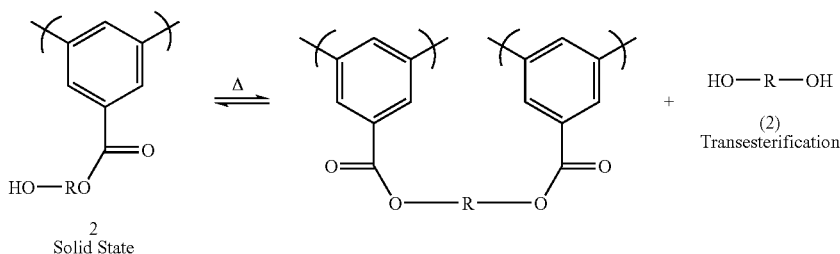

During transesterification, the —OH groups in esters in one monoesterified polyimide polymer chain react with esters in another monoesterified polyimide polymer chain to form a transester or crosslink. Any unconverted —COOH groups in one monoesterified polyimide polymer chain can also react with —OH groups in esters in another monoesterified polyimide polymer chain to form a crosslink. In this manner, the transesterification reaction crosslinks the monoesterified polyimide polymer chains. The crosslinked polyimide polymer can have a ratio of crosslinkable sites to imide groups of between 3:8 and 1:16.

Typical transesterification conditions are known in the art. Generally, transesterification can be accomplished by heating the monoesterified polyimide membrane. Heating initiates the transesterification reaction and, additionally, removes residual solvent.

The monoesterified, polyimide membrane can be heated to crosslink at a temperature of about 150° C. or higher under vacuum. In one embodiment, the monoesterified, polyimide and the permeate is collected at relatively low pressures, the pressure vessel does not need to withstand high pressures and can be made of a light material. Examples of such materials and membrane geometries are discussed in Koros and Fleming, *Journal of Membrane Science*, 83, 1-80, (1993), herein incorporated by reference in its entirety. Since pressure vessels are generally heavy, a low pressure shell design can be beneficial when weight reduction is a priority and the fibers are strong enough to withstand the feed pressure without bursting.

Multiple membrane modules are generally mounted on skids. The membrane modules may be mounted horizontally or vertically. For example, multiple pressure vessels each housing multiple hollow fiber membrane elements may be mounted horizontally onto a skid.

Membrane Elements

Hollow Fiber Membrane Element

As discussed above, a hollow fiber membrane element is manufactured from polymer membranes formed into hollow fibers.

A hollow fiber membrane element can include hollow fibers wrapped around a perforated central tube with both ends of the fibers open to a permeate pot. In use, the natural gas feed stream can flow over and between the fibers. $CO_2$ permeates into the hollow fibers and travels along the bores of the hollow fibers to the permeate pot. The $CO_2$ can then exit the permeate pot through a permeate pipe. Components in the natural gas feed stream that do not permeate into the hollow fibers eventually reach the perforated central tube, which collects these non-permeating components.

A hollow fiber membrane element can also include hollow fibers in bundled arrays potted at either end to form tube sheets and fitted into a pressure vessel thereby isolating the insides of the fibers (bore/tube-side) from the outsides of the fibers (shell-side). The fibers are held together by any conventional means. Typically one end of the fiber bundle extends to one end of the pressure shell and the opposite end of the fiber bundle extends to the opposite end of the pressure shell. The fiber bundle is fixably or removably affixed to the pressure shell by any conventional method to form a pressure tight seal. Devices of this type are known in the art. The direction of flow in a hollow fiber element can be counter-current rather than co-current or even transverse.

Industrial hollow fiber membrane modules typically comprise one or more membrane elements, each containing hundreds of thousands of individual hollow fibers. The number of fibers bundled together into a membrane element will depend on fiber diameters, lengths, and porosities and on desired throughput, equipment costs, and other engineering considerations understood by those in the chemical engineering arts.

Spiral Wound Membrane Element

As discussed above, a spiral wound membrane element is manufactured from polymer membranes formed into flat sheets.

A spiral wound membrane element includes a plurality of envelopes formed from two flat sheets of polymer membranes with a permeate spacer between them. The envelopes are open at one end and separated by feed spacers. The envelopes, along with their accompanying feed spacers, are wrapped around a perforated permeate tube. The open ends of the envelopes face the permeate tube.

In use, the natural gas feed stream can enter the side of the membrane element and travel through the feed spacers along the axis of the membrane element. $CO_2$ permeates into the envelopes and travels to the permeate tube. The $CO_2$ enters the permeate tube through its perforations. The components that do not permeate the envelopes leave the membrane element at the side opposite to the natural gas feed stream.

Flat Stack Permeator

Polymer membranes formed into flat sheets can be used to fabricate a flat stack permeator that includes a multitude of membrane layers alternately spaced by feed-retentate spacers and permeate spacers. The layers can be glued along their edges to define separate feed-retentate zones and permeate zones. Devices of this type are described in U.S. Pat. No. 5,104,532, the contents of which are herein incorporated by reference in their entirety.

Composite Membrane

The polymer membranes may be composite polymer membranes, which are also known as multi-layer membranes. A composite polymer membrane is made of a thin selective (dense) layer of one polymer that is supported by a porous support membrane layer of the same polymer or another polymer (e.g. a less expensive polymer). The thin selective layer is optimized for the particular gas separation. Accordingly, if the polymer membranes are composite polymer membranes, the thin selective layer is made of the crosslinked polyimide polymer as described herein.

Hollow fibers are typically formed from composite polymer membranes. To maximize productivity, the hollow fibers typically include an ultrathin (<2000 Angstroms) "skin" layer on a porous support. Gas separation is accomplished through this selective "skin." This outer "skin" layer may be supported on the same polymer to form an integrally skinned asymmetric hollow fiber membrane. The most advanced membranes have an asymmetric sheath with the selective skin supported on an inexpensive porous core layer (different polymer) to form a composite hollow fiber membrane. This type of device is described in U.S. Pat. No. 5,085,676, the contents of which are incorporated by reference herein in their entirety.

Flat sheets may also be formed from composite polymer membranes.

Embodiments with an Additional Amine Unit

Various embodiments of the process disclosed herein further comprise feeding the $CO_2$-depleted product gas stream originating from the at least one membrane unit to an amine unit to provide a $CO_2$-rich product from the amine unit and a second $CO_2$-depleted product gas stream. In this manner, the at least one membrane unit conducts an initial separation of $CO_2$ from the natural gas feed stream, while the conventional amine unit removes the remaining $CO_2$ to achieve the final specification.

Accordingly, the second $CO_2$-depleted product gas stream is a stream richer in methane and more depleted in $CO_2$ than the $CO_2$-depleted product gas stream from the membrane unit. The second $CO_2$-depleted product gas stream may be sent directly to a nearby or distant market or undergo additional processing to render it more amenable to transport to a nearby or distant market. Such additional processing is known in the art and can involve transforming the gas into a denser, liquid-like form or highly pressurizing the gas so that it is easier to store and transport. Examples of such additional processing include liquefaction to produce liquefied natural gas (LNG), compression to produce compressed natural gas (CNG), or chemical conversion to other liquid products such as Fischer-Tropsch liquids, methanol, dimethyl ether (DME), etc.

Using the at least one membrane unit and the amine unit together to remove $CO_2$ from the natural gas feed stream is advantageous over using an amine unit alone. Membranes are advantageous for bulk $CO_2$ removal applications (i.e. those applications having large natural gas flows or natural gas with high $CO_2$ contents). The percentage of $CO_2$ removal dictates membrane area rather than the $CO_2$ content of the feed gas. For example, the membrane area required for reducing a feed with 10 vol % $CO_2$ to 5 vol % $CO_2$ is similar to the membrane area required for reducing a feed with 50 vol % $CO_2$ to 25 vol % $CO_2$. In contrast, the size of traditional solvent-based $CO_2$ removal systems depend upon the actual amount of $CO_2$ in the feed. A solvent-based system for $CO_2$ removal from 50 vol % to 25 vol % is much larger than a solvent-based system for $CO_2$ removal from 10 vol % to 5 vol %. Accordingly, using an amine unit alone for a large degree of $CO_2$ removal from a large volume flow of natural gas requires a large and expensive amine unit. In contrast, the combined use of the at least one membrane unit and the amine unit reduces the size and cost of the amine unit and its associated infrastructure.

Moreover, the presence of the at least one membrane unit comprising the crosslinked polyimide polymer membranes also serves to de-bottleneck the amine unit, especially if the flow rate or the $CO_2$ concentration of the natural gas feed stream increases.

It would be possible to use an amine unit first followed by the membrane unit, but then many of the advantages described above would be lost.

According to these embodiments, the natural gas feed stream may originate from a subsea gas reserve and the amine unit may be located at an onshore location.

Figure 2:
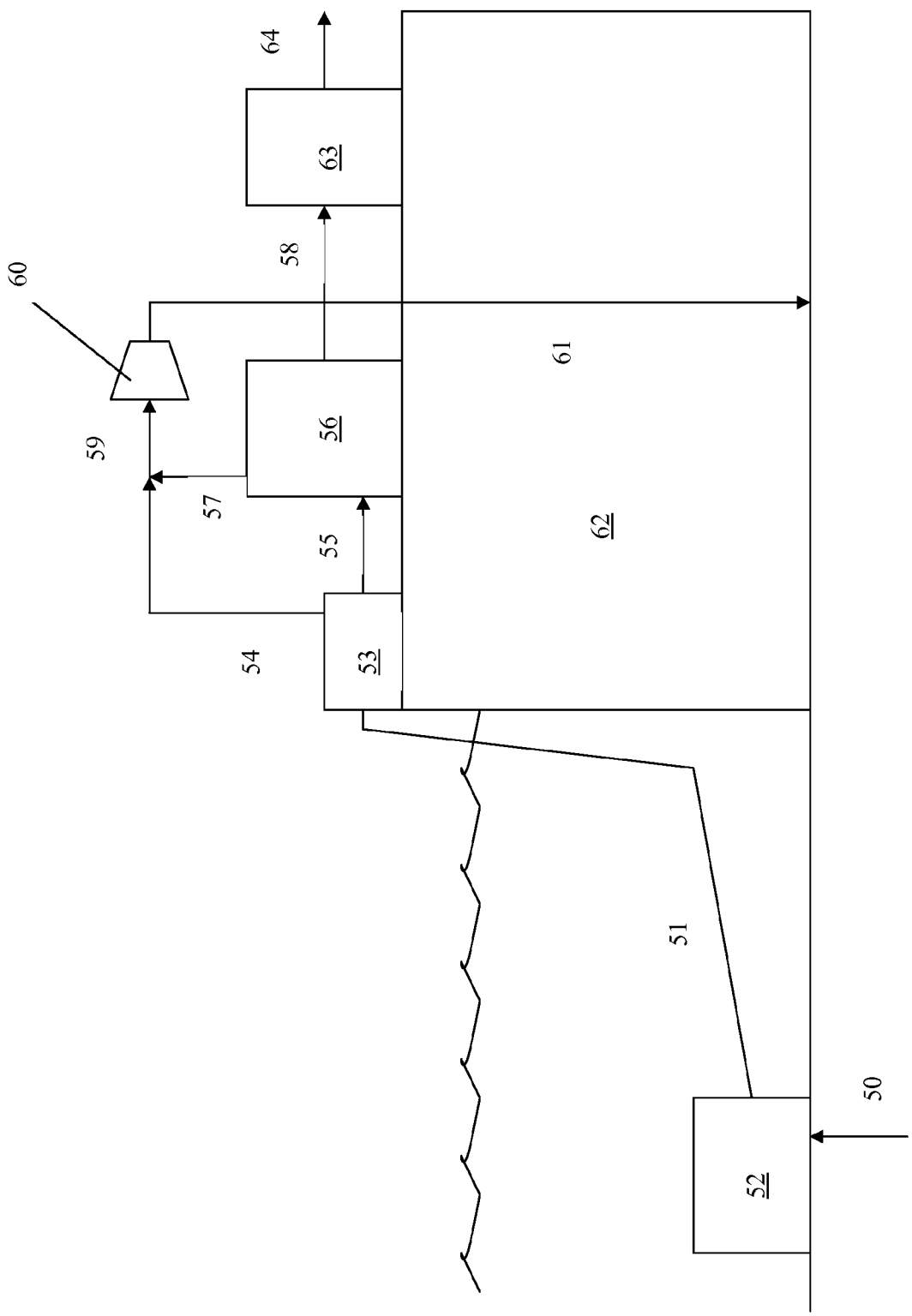
FIG. 2 is a schematic illustration depicting a specific embodiment of the present process, which utilizes at least one membrane unit located onshore and an amine unit located onshore.

The at least one membrane unit may be located at an onshore location along with the amine unit. FIG. 2 illustrates an embodiment where the at least one membrane unit and the amine unit are both located at an onshore location. In FIG. 2, a natural gas feed stream 50 originating from a subsea location (not shown) travels through a subsea pipeline 51 via subsea wellheads 52. The natural gas feed stream 50 exits the subsea pipeline 51 and enters the at least one membrane unit 53, which separates the natural gas feed stream 50 into a $CO_2$-rich permeate 54 and a $CO_2$-depleted product gas stream 55. The $CO_2$-depleted product gas stream 55 then enters an amine unit 56, which separates the $CO_2$-depleted product gas stream 55 into a $CO_2$-rich product 57 from the amine unit and a second $CO_2$-depleted product gas stream 58. The $CO_2$-rich permeate 54 and the $CO_2$-rich product 57 from the amine unit are combined to provide a combined $CO_2$-rich stream 59. This combined $CO_2$-rich stream 59 passes through a compressor 60 to provide a compressed $CO_2$-rich stream 61, which is sequestered in land 62. The second $CO_2$-depleted product gas stream 58 is subjected to additional processing (e.g. liquefaction, compression, chemical conversion, etc.) in an additional processing unit 63 to provide a product gas stream 64.

However, the at least one membrane unit may be advantageously located at a remote, offshore location, while the amine unit is located at an onshore location.

One advantage of using the at least one membrane unit located at a remote, offshore location with the amine unit located at an onshore location is related to weight, footprint, and energy consumption. The crosslinked polyimide polymer membranes are lighter, take up less space, and require less energy than the equipment associated with traditional $CO_2$ removal processes using amine solvent solutions.

Another advantage of using the at least one membrane unit located at a remote, offshore location with the amine unit located at an onshore location lies in the subsea pipeline. When gas treatment facilities (i.e. the at least one membrane unit and the amine unit) are located onshore, the subsea pipeline carrying the natural gas feed stream to the gas treatment facilities must be alloyed to avoid corrosion and must have a relatively large diameter to accommodate a significant volume of $CO_2$. In contrast, with the at least one membrane unit located at a remote, offshore location, it may be possible to use a non-alloyed (e.g. carbon steel) subsea pipeline to transport the $CO_2$-depleted product gas stream from the at least one membrane unit to the amine unit. Moreover, since a significant volume of $CO_2$ is removed by the at least one membrane unit offshore, the diameter of the subsea pipeline can be correspondingly smaller. Therefore, one benefit of locating the at least one membrane unit at a remote, offshore location is a smaller, less expensive subsea pipeline.

Yet another advantage of using the at least one membrane unit located at a remote, offshore location with the amine unit located at an onshore location involves the formation of natural gas hydrates. When gas treatment facilities (i.e. the at least one membrane unit and the amine unit) are located onshore, the natural gas traveling in the subsea pipeline to the gas treatment facilities may be subject to the formation of natural gas hydrates due to its water content. As such, it may be necessary to inject inhibitors (e.g. glycol or methanol) into the subsea pipeline. Injecting inhibitors increases the cost of natural gas processing due to the cost of the inhibitors and the fact that the inhibitors normally must be recovered. In contrast, when the at least one membrane unit is located at a remote, offshore location, the polymer membranes comprising the crosslinked polyimide polymer can remove a sufficient amount of water from the natural gas such that hydrate inhibitors may not be needed. Therefore, another possible benefit of locating the at least one membrane unit at a remote, offshore location is the elimination of hydrate inhibitors.

An additional advantage of using the at least one membrane unit located at a remote, offshore location with the amine unit located at an onshore location involves reinjection and sequestration. When gas treatment facilities (i.e. the at least one membrane unit and the amine unit) are located onshore, it may not be possible to sequester both the $CO_2$-rich permeate and the $CO_2$-rich product from the amine unit because the onshore facilities may not have the volume capacity, environmental support, or laws to allow injection of large quantities of acid gases (e.g. $CO_2$ and $H_2S$). In contrast, when the at least one membrane unit is located at a remote, offshore location, it may be possible to compress and reinject the $CO_2$-rich permeate in an offshore well (e.g. a functioning oil well or a depleted gas or oil well), rather than completely relying on $CO_2$ sequestration onshore.

Figure 3:
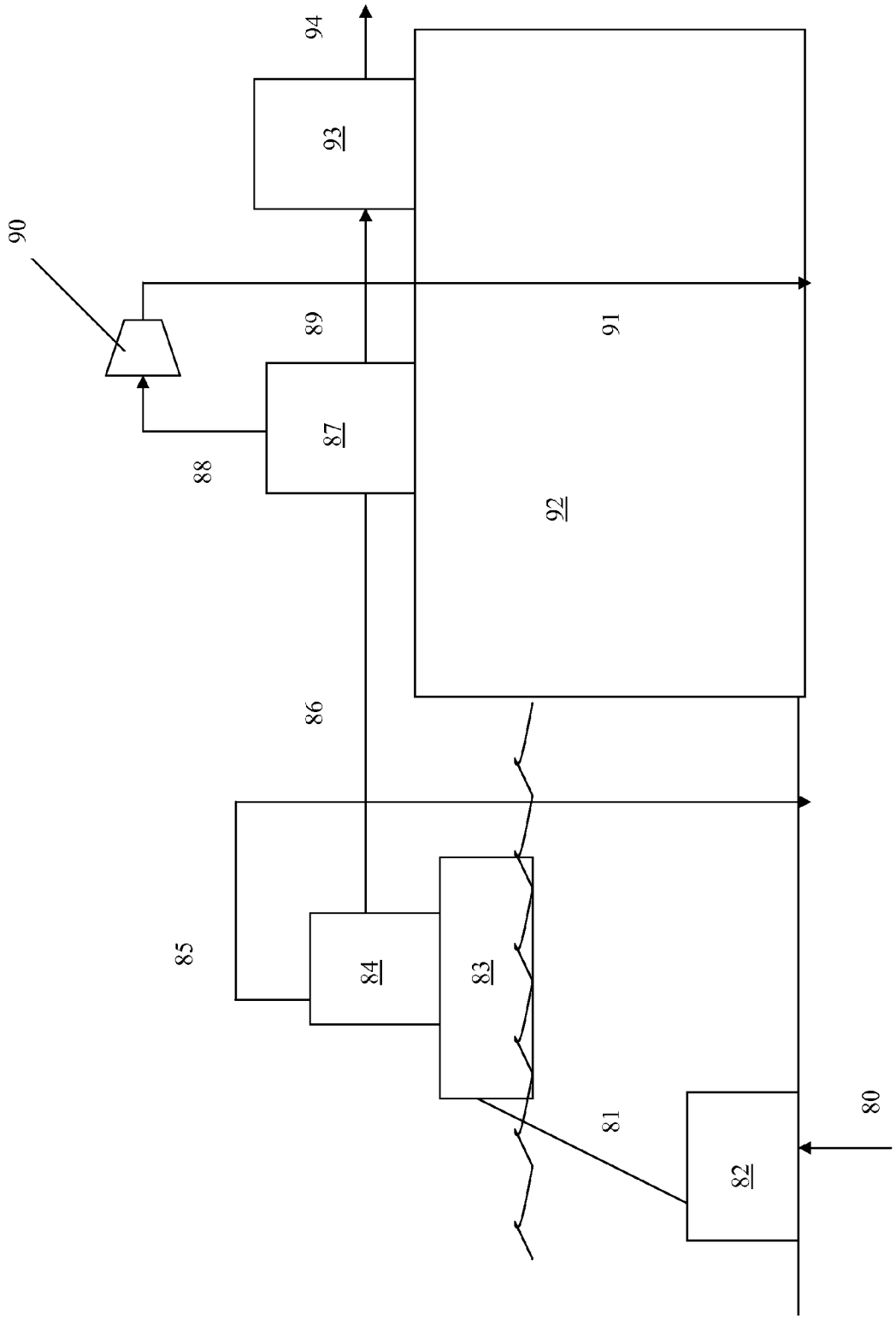
FIG. 3 is a schematic illustration depicting a specific embodiment of the present process, which utilizes at least one membrane unit located at a remote, offshore location and an amine unit located onshore.

If the at least one membrane unit is located at a remote, offshore location, the remote, offshore location may be a fixed, floating platform. FIG. 3 illustrates an embodiment where the at least one membrane unit is located on a fixed, floating platform and the amine unit is located at an onshore location. In FIG. 3, a natural gas feed stream 80 originating from a subsea location (not shown) travels through subsea wellheads 82 and a line 81 to the at least one membrane unit 84, which is located on a fixed, floating platform 83. The at least one membrane unit 84 separates the natural gas feed stream 80 into a $CO_2$-rich permeate 85 and a $CO_2$-depleted product gas stream. The $CO_2$-rich permeate 85 is injected into an offshore reservoir (not shown). The $CO_2$-depleted product gas stream travels through a pipeline 86 to an onshore amine unit 87. The onshore amine unit 87 separates the $CO_2$-depleted product gas stream from the pipeline 86 into a $CO_2$-rich product 88 from the amine unit and a second $CO_2$-depleted product gas stream 89. The $CO_2$-rich product 88 from the amine unit passes through a compressor 90 to provide a compressed gas stream 91, which is sequestered in land 92. The second $CO_2$-depleted product gas stream 89 is subjected to additional processing (e.g. liquefaction, compression, chemical conversion, etc.) in an additional processing unit 93 to provide a product gas stream 94.

Alternatively, the remote, offshore location may be a mobile, floating facility (e.g. a modified ship, barge, etc.). FIG. 3 also illustrates an embodiment where the at least one membrane unit is located on a mobile, floating facility and the amine unit is located at an onshore location. When the at least one membrane unit is located on a mobile, floating facility, reference numeral 83 represents a mobile, floating facility rather than a fixed, floating platform.

Using a mobile, floating facility to house the at least one membrane unit is further advantageous because the at least one membrane unit can process natural gas from multiple, subsea gas wells that are located long distances from each other. The mobile, floating facility can move between the multiple, subsea gas wells as needed.

As another alternative, if the at least one membrane unit is located at a remote, offshore location, the remote, offshore location may be subsea. Accordingly, the at least one membrane unit can be a subsea unit. If the at least one membrane unit is located subsea, the process illustrated in FIG. 3 remains the same, however, the mobile, floating facility or fixed, floating platform 83 is not present and the line 81 and the at least one membrane unit 84 are deployed subsea.

The crosslinked polyimide polymer membranes have sufficient robustness to be deployed subsea. Deploying the at least one membrane unit subsea avoids the need for a fixed, floating platform or a mobile, floating platform, with their associated expenses. Additionally, the subsea pressure can help drive separation within the crosslinked polyimide polymer membranes. Furthermore, due to the subsea pressure, less compression is necessary prior to reinjection or sequestration of the $CO_2$-rich permeate.

According to these embodiments, the $CO_2$-rich permeate can be reinjected or sequestered. The $CO_2$-rich product from the amine unit can also be reinjected or sequestered.

When both the at least one membrane unit and the amine unit are located onshore, the $CO_2$-rich permeate and the $CO_2$-rich product from the amine unit can be combined and then reinjected or sequestered.

Embodiment with Offshore Natural Gas Recovery and Treatment

Yet another embodiment of the process for producing a $CO_2$-depleted product gas stream as described herein is specifically directed to recovering natural gas offshore, treating the recovered natural gas offshore to reduce its $CO_2$ content, and transferring the treated natural gas onshore. This embodiment includes providing a natural gas feed stream comprising greater than about 10 vol % $CO_2$ at a remote, offshore location. The natural gas feed stream is then fed to at least one membrane unit comprising a plurality of polymer membranes to provide a $CO_2$-rich permeate comprising at least 95 vol % $CO_2$ and a $CO_2$-depleted product gas stream. The polymer membranes comprise a particular crosslinked polyimide polymer having covalent ester crosslinks and have a $CO_2$ permeance of at least 20 GPU and a $CO_2/CH_4$ selectivity of greater than 20, at 35 degrees C. and a feed pressure of 100 psia. This embodiment further includes forwarding the $CO_2$-depleted product gas stream through a pipeline to an onshore facility.

Apparatus for Producing a $CO_2$-Depleted Product Gas Stream

As discussed above, the higher permeance of the particular crosslinked polyimide polymer membranes distinguishes them from prior art membranes. However, with shell-side feed to hollow fibers, higher permeance causes the pressure drop in the bore of the fibers to increase. This is undesirable for separation productivity and efficiency. Rather, it is desirable to minimize pressure drop in the bore of the fiber.

The present inventors have discovered that, to minimize pressure drop in the bore of the fiber, fiber length can be shortened or bore diameter can be increased. See Example 8. Thus, with the crosslinked polyimide polymer membranes, there are certain combinations of fiber lengths and bore diameters that are more preferable than others. The prior art membranes do not benefit from these same combinations since their permeance is significantly lower than the permeance of the crosslinked polyimide polymer membranes.

Accordingly, further disclosed herein is an apparatus incorporating the membranes made from the particular crosslinked polyimide polymer. The apparatus can utilize the polymer membranes to produce a $CO_2$-depleted product gas stream from a natural gas feed stream. The apparatus comprises one or more membrane modules. Each membrane module comprises one or more membrane elements. Each membrane element comprises a plurality of polymer membranes formed into hollow fibers. The polymer membranes comprise a crosslinked polyimide polymer having covalent ester crosslinks and have a permeance of at least 20 GPU and a $CO_2/CH_4$ selectivity of greater than 20, at 35 degrees C. and a feed pressure of 100 psia. Importantly, the hollow fibers have a bore diameter greater than about 25 microns and a fiber length of less than about 15 feet.

In one embodiment, the hollow fibers have a bore diameter greater than about 50 microns. In another embodiment, the hollow fibers have a bore diameter greater than about 100 microns. In yet another embodiment, the hollow fibers have a fiber length less than about 10 feet.

As discussed above, multiple membrane modules are generally mounted on skids. Accordingly, since the apparatus comprises one or more membrane modules, a plurality of membrane modules may be mounted on a skid.

Due to the higher $CO_2$ permeance and higher $CO_2/CH_4$ selectivity of the crosslinked polyimide polymer membranes, the present apparatus is advantageous because it is generally lighter in weight and smaller in size than similar apparatuses incorporating prior art membranes having lower $CO_2$ permeance and lower $CO_2/CH_4$ selectivity.

The following examples are provided to further illustrate the present processes and apparatus and advantages thereof. The examples are meant to be only illustrative, and not limiting.

EXAMPLES

Comparative Example 1, Comparative Example 2, Example 3, and Example 5 were based on fixed dimensions (i.e. outer diameter, length, fiber packing density, etc.).

Comparative Example 1

Conventional Cellulose Acetate Membrane Process Scheme (96% Methane Recovery)

Figure 4:
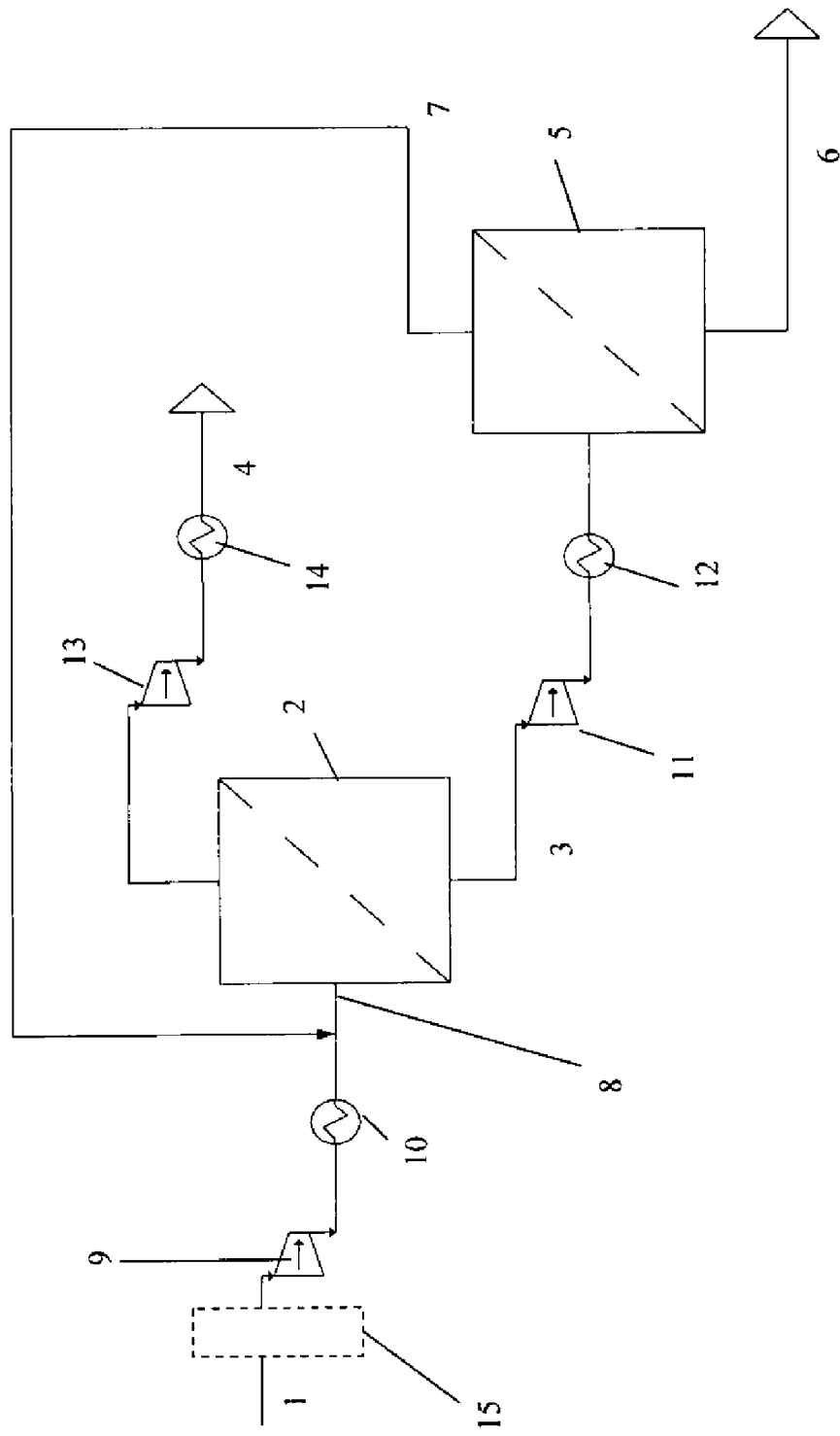
FIG. 4 is a process flow diagram illustrating a $CO_2$ removal process utilizing two membrane units.

Comparative Example 1 is based upon the process flow diagram illustrated in FIG. 4. A natural gas feed stream 1 containing 35 vol % $CO_2$ was fed at a flow rate of 250 million standard cubic feet per day (MMSCFD) to a first membrane unit 2 comprising a conventional cellulose acetate membrane having a $CO_2$ permeance of 16.8 GPU and a $CO_2/CH_4$ selectivity of 12. The natural gas feed stream 1 was originally at a temperature of 90° F. and a pressure of 314.7 psia prior to passing through a first compressor 9 and a first heat exchanger 10, where it was compressed and heated to a temperature of 100° F. and a pressure of 650 psia. The first membrane unit 2 provided a first permeate stream 3 and a $CO_2$-depleted product gas stream 4. The first permeate stream 3, after passing through a second compressor 11 and a second heat exchanger 12, was fed to a second membrane unit 5 comprising the same cellulose acetate membrane. The second membrane unit 5 provided a $CO_2$-rich permeate 6 and a second retentate stream 7. The second retentate stream 7 was recycled and blended with the natural gas feed stream 1 prior to the first membrane unit 2 to provide a combined stream 8. This combined stream 8 entered the first membrane unit 2 at a temperature of 100° F. and a pressure of 650 psia. The $CO_2$-rich permeate 6, which contained 88 vol % $CO_2$ and was at a temperature of 100° F. and a pressure of 50 psia, exited the second membrane unit 5 at a flow rate of 47 MMSCFD. The $CO_2$-depleted product gas stream 4 contained 23 vol % $CO_2$ and exited the first membrane unit 2 at a flow rate of 203 MMSCFD. After passing through a third compressor 13 and a third heat exchanger 14, the $CO_2$-depleted product gas stream 4 was at a temperature of 140° F. and a pressure of 1440 psia.

In order to flare the $CO_2$-rich permeate 6, approximately 18 MMSCFD of the $CO_2$-depleted product gas stream 4 was diverted as flare-assist gas and blended with the $CO_2$-rich permeate. Accordingly, approximately 5-6 MMSCFD methane from the $CO_2$-depleted product gas stream 4 was flared. The total $CO_2$ emitted was 1.2 million metric tons per annum (MMPTA) with 0.84 MMTPA attributable the $CO_2$-rich permeate 6 and 0.36 MMTPA attributable to burning the flare-assist gas.

Comparative Example 2

Conventional Cellulose Acetate Membrane Process Scheme (98% Methane Recovery)

Comparative Example 2 is based upon the process flow diagram illustrated in FIG. 4. A natural gas feed stream 1 containing 21 vol % $CO_2$ was fed at a flow rate of 660 million standard cubic feet per day (MMSCFD) to a first membrane unit 2 comprising a conventional cellulose acetate membrane having a $CO_2$ permeance of 16.8 GPU and a $CO_2/CH_4$ selectivity of 12. The natural gas feed stream 1 was originally at a temperature of 100° F. and a pressure of 314.7 psia prior to passing through a pretreatment unit 15, a first compressor 9, and a first heat exchanger 10, where it was pretreated, compressed, and heated to a temperature of 100° F. and a pressure of 650 psia. The first membrane unit 2 provided a first permeate stream 3 and a $CO_2$-depleted product gas stream 4. The first permeate stream 3, after passing through a second compressor 11 and a second heat exchanger 12, was fed to a second membrane unit 5 comprising the same cellulose acetate membrane. The second membrane unit 5 provided a $CO_2$-rich permeate 6 and a second retentate stream 7. The second retentate stream 7 was recycled and blended with the natural gas feed stream 1 prior to the first membrane unit 2 to provide a combined stream 8. This combined stream 8 entered the first membrane unit 2 at a temperature of 100° F. and a pressure of 650 psia. The $CO_2$-rich permeate 6, which contained 90 vol % $CO_2$ and was at a temperature of 100° F. and a pressure of 50 psia, exited the second membrane unit 5 at a flow rate of 106 MMSCFD. The $CO_2$-depleted product gas stream 4 contained 8 vol % $CO_2$ and exited the first membrane unit 2 at a flow rate of 554 MMSCFD. After passing through a third compressor 13 and a third heat exchanger 14, the $CO_2$-depleted product gas stream 4 was at a temperature of 140° F. and a pressure of 2000 psia.

In order to flare the $CO_2$-rich permeate 6, approximately 34 MMSCFD of the $CO_2$-depleted product gas stream 4 was diverted as flare-assist gas and blended with the $CO_2$-rich permeate. Accordingly, approximately 10.6 MMSCFD methane from the $CO_2$-depleted product gas stream 4 was flared. The total $CO_2$ emitted was 2.1 million metric tons per annum (MMPTA) with 1.8 MMTPA attributable the $CO_2$-rich permeate 6 and 0.8 MMTPA attributable to burning the flare-assist gas.

Example 3

Crosslinked Polyimide Polymer Membrane Process Scheme (99% Methane Recovery)

Example 3 is based upon the process flow diagram illustrated in FIG. 4. A natural gas feed stream 1 containing 35 vol % $CO_2$ was fed at a flow rate of 250 million standard cubic feet per day (MMSCFD) to a first membrane unit 2 comprising a crosslinked polyimide polymer membrane having an estimated $CO_2$ permeance of 50 GPU and an estimated $CO_2/CH_4$ selectivity of 25. The natural gas feed stream 1 was originally at a temperature of 90° F. and a pressure of 314.7 psia prior to passing through a first compressor 9 and a first heat exchanger 10, where it was compressed and heated to a temperature of 100° F. and a pressure of 650 psia. The first membrane unit 2 provided a first permeate stream 3 and a $CO_2$-depleted product gas stream 4. The first permeate stream 3, after passing through a second compressor 11 and a second heat exchanger 12, was fed to a second membrane unit 5 comprising another crosslinked polyimide polymer membrane having an estimated $CO_2$ permeance of 50 GPU and an estimated $CO_2/CH_4$ selectivity of 25. The second membrane unit 5 provided a $CO_2$-rich permeate 6 and a second retentate stream 7. The second retentate stream 7 was recycled and blended with the natural gas feed stream 1 prior to the first membrane unit 2 to provide a combined stream 8. This combined stream 8 entered the first membrane unit 2 at a temperature of 100° F. and a pressure of 650 psia. The $CO_2$-rich permeate 6, which contained 95 vol % $CO_2$ and was at a temperature of 100° F. and a pressure of 50 psia, exited the second membrane unit 5 at a flow rate of 40 MMSCFD. Accordingly, only approximately 2 MMSCFD methane is lost. The $CO_2$-depleted product gas stream 4 contained 23 vol % $CO_2$ and exited the first membrane unit 2 at a flow rate of 210 MMSCFD. After passing through a third compressor 13 and a third heat exchanger 14, the $CO_2$-depleted product gas stream 4 was at a temperature of 140° F. and a pressure of 1440 psia.

Venting the $CO_2$-rich permeate emitted 0.79 MMPTA of $CO_2$. This is a 34% reduction in $CO_2$ emissions compared to Comparative Example 1.

Alternatively, if the $CO_2$-rich permeate from either the crosslinked polyimide polymer membranes or the cellulose acetate membranes is reinjected or sequestered, the crosslinked polyimide polymer membranes are still advantageous over the conventional cellulose acetate membranes. This is due to the fact that the crosslinked polyimide polymer membranes exhibit less methane slippage into the $CO_2$-rich permeate than the cellulose acetate membranes. The $CO_2$-rich permeate had 95 vol % $CO_2$ with the crosslinked polyimide polymer membranes, but only 88 vol % $CO_2$ with the cellulose acetate membranes. Accordingly, less methane is present in the $CO_2$-rich permeate with the crosslinked polyimide polymer membranes.

As another alternative, if the $CO_2$-rich permeate from either the crosslinked polyimide polymer membranes or the cellulose acetate membranes is vented, the crosslinked polymer membranes are also advantageous over the conventional cellulose acetate membranes. This is due to the fact that the crosslinked polyimide polymer membranes exhibit less methane slippage into the $CO_2$-rich permeate than the cellulose acetate membranes. As such, with the crosslinked polyimide polymer membranes, less methane is vented with less GHG impact.

Example 4

Membrane Modules, Skid Weight, and Skid Footprint of Conventional Cellulose Acetate Membrane v. Crosslinked Polyimide Polymer Membrane The number of membrane modules, skid weight, and skid footprint was calculated for the Conventional Cellulose Acetate Membrane Process Scheme of Example 1, which uses the cellulose acetate membranes having a $CO_2$ permeance of 16.8 GPU and a $CO_2/CH_4$ selectivity of 12. The number of membrane modules, the skid weight, and the skid footprint are set forth in Table 2.

Similarly, for three crosslinked polyimide polymer membranes (XLP 1, XLP 2, and XLP 3), the number of membrane modules, skid weight, and skid footprint was calculated based upon use of the membranes in the process scheme of Example 3. The estimated $CO_2$ permeances and $CO_2/CH_4$ selectivities of the three crosslinked polyimide polymer membranes are provided in Table 3. The number of membrane modules, the skid weight, and the skid footprint for all three crosslinked polyimide polymer membranes are also set forth in Table 2.

TABLE 2

| Membrane | # of Membrane Modules | Total Skid Weight (dry tons) | Total Skid Footprint ($ft^2$) |
|---|---|---|---|
| Cellulose acetate | 182 | 76 | 308 |
| XLP 1 | 85 | 35 | 144 |
| XLP 2 | 59 | 25 | 100 |
| XLP 3 | 30 | 12 | 50 |

TABLE 3

|  | XLP 1 | XLP 2 | XLP 3 |
|---|---|---|---|
| $CO_2/CH_4$ Selectivity | 20 | 25 | 35 |
| $CO_2$ Permeance (GPU) | 35 | 50 | 100 |

Example 5

Crosslinked Polyimide Polymer Membrane Process Scheme (99% Methane Recovery)

Example 5 is based upon the process flow diagram illustrated in FIG. 4. A natural gas feed stream 1 containing 21 vol % $CO_2$ was fed at a flow rate of 660 million standard cubic feet per day (MMSCFD) to a first membrane unit 2 comprising a crosslinked polyimide polymer membrane having an estimated $CO_2$ permeance of 50 GPU and an estimated $CO_2/CH_4$ selectivity of 25. The natural gas feed stream 1 was originally at a temperature of 100° F. and a pressure of 314.7 psia prior to passing through a pretreatment unit 15, a first compressor 9, and a first heat exchanger 10, where it was pretreated, compressed, and heated to a temperature of 100° F. and a pressure of 650 psia. The first membrane unit 2 provided a first permeate stream 3 and a $CO_2$-depleted product gas stream 4. The first permeate stream 3, after passing through a second compressor 11 and a second heat exchanger 12, was fed to a second membrane unit 5 comprising the same crosslinked polyimide polymer membrane having an estimated $CO_2$ permeance of 50 GPU and an estimated $CO_2/CH_4$ selectivity of 25. The second membrane unit 5 provided a $CO_2$-rich permeate 6 and a second retentate stream 7. The second retentate stream 7 was recycled and blended with the natural gas feed stream 1 prior to the first membrane unit 2 to provide a combined stream 8. This combined stream 8 entered the first membrane unit 2 at a temperature of 100° F. and a pressure of 650 psia. The $CO_2$-rich permeate 6, which contained 96 vol % $CO_2$ and was at a temperature of 100° F. and a pressure of 50 psia, exited the second membrane unit 5 at a flow rate of 100 MMSCFD. Accordingly, only approximately 4 MMSCFD methane was lost. The $CO_2$-depleted product gas stream 4 contained 8 vol % $CO_2$ and exited the first membrane unit 2 at a flow rate of 560 MMSCFD. After passing through a third compressor 13 and a third heat exchanger 14, the $CO_2$-depleted product gas stream 4 was at a temperature of 140° F. and a pressure of 2000 psia.

Venting the $CO_2$-rich permeate emitted 1.8 MMPTA of $CO_2$. This was a 31% reduction in $CO_2$ emissions compared to Comparative Example 2.

Alternatively, if the $CO_2$-rich permeate from either the crosslinked polyimide polymer membranes or the cellulose acetate membranes is reinjected or sequestered, the crosslinked polyimide polymer membranes are still advantageous over the conventional cellulose acetate membranes. This is due to the fact that the crosslinked polyimide polymer membranes exhibit less methane slippage into the $CO_2$-rich permeate than the cellulose acetate membranes. The $CO_2$-rich permeate had 96 vol % $CO_2$ with the crosslinked polyimide polymer membranes, but only 90 vol % $CO_2$ with the cellulose acetate membranes. Accordingly, less methane is present in the $CO_2$-rich permeate with the crosslinked polyimide polymer membranes.

As another alternative, if the $CO_2$-rich permeate from either the crosslinked polyimide polymer membranes or the cellulose acetate membranes is vented, the crosslinked polymer membranes are also advantageous over the conventional cellulose acetate membranes. This is due to the fact that the crosslinked polyimide polymer membranes exhibit less methane slippage into the $CO_2$-rich permeate than the cellulose acetate membranes. As such, with the crosslinked polyimide polymer membranes, less methane is vented with less GHG impact.

Example 6

Membrane Modules, Skid Weight, and Skid Footprint of Conventional Cellulose Acetate Membrane v. Crosslinked Polyimide Polymer Membrane The number of membrane modules, skid weight, and footprint was calculated for the Conventional Cellulose Acetate Membrane Process Scheme of Example 2, which uses the cellulose acetate membranes having a $CO_2$ permeance of 16.8 GPU and a $CO_2/CH_4$ selectivity of 12. The number of membrane modules, the skid weight, and the skid footprint are set forth in Table 4.

Similarly, for three crosslinked polyimide polymer membranes (XLP 1, XLP 2, and XLP 3), the number of membrane modules, skid weight, and skid footprint was calculated based upon use of the membranes in the process scheme of Example 5. The estimated $CO_2$ permeances and $CO_2/CH_4$ selectivities of the three crosslinked polyimide polymer membranes are provided in Table 3. The number of membrane modules, the skid weight, and the skid footprint for all three crosslinked polyimide polymer membranes are also set forth in Table 4.

TABLE 4

| Membrane | # of Membrane Modules | Total Skid Weight (dry tons) | Total Skid Footprint ($ft^2$) |
|---|---|---|---|
| Cellulose acetate | 969 | 404 | 1638 |
| XLP 1 | 477 | 199 | 807 |
| XLP 2 | 337 | 140 | 569 |
| XLP 3 | 174 | 73 | 295 |

Example 7

Experimental Support for Estimated $CO_2$ Permeance and $CO_2/CH_4$ Selectivity of Crosslinked Polyimide Polymer Membranes In a first experiment, in order to estimate $CO_2$ permeance and $CO_2/CH_4$ selectivity, various binary, water vapor saturated feed mixtures of $CO_2$ and $CH_4$ were fed to a crosslinked polyimide polymer membrane film (CVX-MEM-B1). The experimental set-up and procedure used was similar to the method described in T. C. Merkel and L. G. Toy, Comparison of Hydrogen Sulfide Transport Properties in Fluorinated and Nonfluorinated Polymers, *Macromolecules*, 39: 7591-7600 (2006) and Merkel et al., Mixed-gas permeation of syngas components in poly(dimethylsiloxane) and poly(1-trimethylsilyl-1-propyne) at elevated temperatures, *Journal of Membrane Science*, 191: 85-94 (2001). The binary, water vapor saturated feed mixtures of $CO_2$ and $CH_4$ were fed at various temperatures and pressures. The crosslinked polyimide polymer membrane film had a thickness of 85 μm and an effective membrane area of 13.8 cm² and was placed in a cell at a temperature of 54° C. The permeate was maintained at 0 psig. The stage cut was <0.9%. A downstream helium sweep had a flow rate of 24-39 cm³/min.

The permeabilities of $CH_4$, $CO_2$, and $H_2O$, respectively, for each test run were calculated using $$P_i = \left(\frac{x_i^P Hl}{x_{He}^P A \Delta p_i}\right)\left(\frac{273.15 p_a}{76 T}\right),$$

as described in T. C. Merkel and L. G. Toy, Comparison of Hydrogen Sulfide Transport Properties in Fluorinated and Nonfluorinated Polymers, *Macromolecules*, 39: 7591-7600 (2006), where $P_i$ is the permeability coefficient of component i, H is the helium sweep gas flow rate, $x_i^P$ is the mole fraction of component i in the permeate stream, $x_{He}^P$ is the mole fraction of sweep helium in the permeate stream, l is the film thickness, A is the film area available for permeation, $\Delta p_i$ is the partial pressure difference across the film for component i, T is the experimental temperature, and $p_a$ is atmospheric pressure. All permeability coefficients were reported in units of barrers, where 1 Barrer=$10^{-10}$ cm³(STP).cm/(cm².s.cmHg). The following selectivities were also calculated for each test run: $CO_2/CH_4$, $H_2O/CH_4$, and $H_2O/CO_2$. The permeabilities and selectivities for each test run are set forth in Table 5 along with the binary feed mixture composition on a dry basis, the feed temperature, the feed pressure, and the feed water vapor concentration.

TABLE 5

Mixed-Gas Permeation Properties Measured in Chevron Membrane Film CVX-MEM-B1 with Water-Vapor-Saturated $CO_2/CH_4$ Mixtures at Different Temperatures and Feed Pressures

| Binary feed mixture composition (dry basis) | Temperature (° C.) | Feed pressure (psig) | Feed H₂O vapor concentration (%) | Mixed-gas permeability (barrer) | | | Mixed-gas selectivity | | |
|---|---|---|---|---|---|---|---|---|---|
| | | | | CH₄ | CO₂ | H₂O | CO₂/CH₄ | H₂O/CH₄ | H₂O/CO₂ |
| 10% CO₂/90% CH₄ | 23 | 600 | 0.066 | 0.18 | 10.5 | 2,900 | 58 | 16,000 | 280 |
| | 50 | 300 | 0.57 | 0.89 | 28.5 | 4,500 | 32 | 5,100 | 160 |
| | | 600 | 0.29 | 0.77 | 25 | 3,900 | 32 | 5,100 | 160 |
| | | 905 | 0.20 | 0.81 | 24 | 1,700 | 30 | 2,100 | 71 |
| 50% CO₂/50% CH₄ | 23 | 600 | 0.066 | 0.44 | 18 | 5,600 | 41 | 13,000 | 310 |
| | 50 | 300 | 0.55 | 0.83 | 26 | 4,600 | 31 | 5,500 | 180 |
| | | 600 | 0.28 | 0.97 | 24 | 3,600 | 25 | 3,700 | 150 |
| | | 880 | 0.20 | 0.91 | 21 | 4,000 | 23 | 4,400 | 190 |
| 90% CO₂/10% CH₄ | 23 | 400 | 0.097 | <0.9ᵃ | 22 | 4,400 | >24 | >4,900 | 200 |
| | 50 | 200ᵇ | 0.88 | <1.7ᵃ | 29 | 2,700 | >17 | >1,500 | 93 |
| | | 400 | 0.42 | <0.9ᵃ | 26 | 3,900 | >29 | >4,300 | 150 |
| | | 480 | 0.35 | 0.78 | 28 | 1,200 | 36 | 1,500 | 43 |

1 barrer = 1 × 10⁻¹⁰ cm³ (STP) · cm/(cm² · s · cmHg)
Film thickness = 85 μm
Effective membrane area = 13.8 cm²
Permeate pressure = 0 psig; Stage-cut <0.9%; Downstream helium sweep flow rate = 24-39 cm³/min
ᵃSpecific value could not be obtained because species concentration was below GC resolution.
ᵇActual permeation cell temperature = 54° C.

In another experiment, three hollow fibers of crosslinked polyimide polymer membrane were potted in test modules. Each hollow fiber had a diameter of 260 μm and an active length of 12.5 cm. Each module had an effective module membrane area of 3.06 cm².

Each test module was fabricated from two stainless steel (316) Swagelok® ¼-inch tees, stainless steel ¼-inch tubing and nuts, two brass NPT ¼-inch female-tube adapters, two brass NPT ¼-inch male-tube adapters, and two brass Swagelok® ¼-inch nuts. The hollow fibers were threaded through the module house, so that a length of the hollow fibers extended on each end. The ends of the module were then plugged with 3M™ Scotch-Weld™ Epoxy Adhesive DP100 and cured overnight. The ends of the fiber were snapped off after the epoxy adhesive hardened.

Gas transport through the hollow fibers was examined with a bubble flow-meter testing system. The system permitted sampling of gas streams with a gas chromatograph. The testing modules were attached in a shell feed method of operation. Mixed feed gas from a compressed gas cylinder was supplied on the shell-side of the test module at a flow rate between 244 and 256 cm³/min. No downstream sweep gas was used. The test module was placed in a permeation box maintained at a constant temperature. The compositions of all the streams were determined by the gas chromatograph. Individual gas fluxes were then calculated.

Gases were fed on the shell side and permeation rate through the fibers was measured with a bubble-flow meter and a stop watch since the permeation rate is relatively high.

The permeate pressure was 0 psig. The flux measured with the bubble flow meter was converted to permeance using fugacity coefficients from the virial equation-of-state, which corrects for the non-ideal gas phase thermodynamics occurring at high feed pressures. A stage cut (i.e. ratio of permeate flow rate to feed flow rate) of approximately 1% or less was used to minimize the effects of concentration polarization during testing and to maintain the upstream at constant composition, which simplifies the performance analysis. The selectivity was calculated by taking the ratio of the permeances.

A variety of pure feed gases and mixed feed gases were fed to the test modules in various test runs. Table 6 sets forth the composition of the feed gases, the feed temperature, the feed pressure, and the resulting permeances and selectivities.

As shown in Tables 5 and 6, the selectivities ranged between approximately 17 and 58 depending upon temperature, $CO_2$ partial pressure, and the presence of major impurities such as $H_2O$ and $H_2S$. Accordingly, the crosslinked polyimide polymer membranes (XLP 1, XLP 2, and XLP 3) were estimated to have selectivities with real natural gas feeds of between 20 and 35. These estimates are based on the fact that some degree of performance decline will result with real natural gas feeds.

As shown in Table 5, the $CO_2$ permeability of the crosslinked polyimide polymer membrane film ranged between approximately 10 and 29 barrers. Accordingly, if hollow fibers with 1 micron thick active layer skins were developed from the crosslinked polyimide polymer membrane film, the hollow fibers would be expected to have $CO_2$ permeances of between approximately 10 and 29 GPU.

As shown in Table 6, the $CO_2$ permeances ranged between approximately 17 and 58 GPU. However, commercial hollow fibers have skins that are much thinner (e.g. 0.1 micron) than these laboratory scale hollow fibers. Thus, expected $CO_2$ permeances for commercial hollow fibers of the crosslinked polyimide polymer membrane are approximately 100 to 290 GPU.

Accordingly, the estimated $CO_2$ permeances for the crosslinked polyimide polymer membranes (XLP 1, XLP 2, and XLP 3) are consistent with $CO_2$ permeances achievable both in laboratory scale hollow fibers and commercial hollow fibers.

TABLE 6

Chevron Lab-Scale Hollow-fiber Module: $CH_4$, $CO_2$, and $H_2S$ Permeation Properties

| Feed gas | Temperature (°C.) | Feed pressure (psig) | Pure- or mixed-gas permeance [×10$^{-6}$ cm$^3$ (STP)/cm$^2$ · s · cmHg] | | | Pure- or mixed-gas selectivity | | |
|---|---|---|---|---|---|---|---|---|
| | | | $CH_4$ | $CO_2$ | $H_2S$ | $CO_2/CH_4$ | $CO_2/H_2S$ | $H_2S/CH_4$ |
| Chevron preliminary data . . . | | | | | | | | |
| 20% $CO_2$ and 80% $CH_4$ | (Not provided) | 185 (200 psia) | 1.54 | 58.4 | — | 38 | — | — |
| Pure-gas check BEFORE starting $H_2S/CO_2/CH_4$ mixture tests . . . | | | | | | | | |
| Pure $CH_4$/Pure $CO_2$ | 35 | 300 | 1.2 | 55 | — | 46 | — | — |
| 4.1% $H_2S$, 21.0% $CO_2$, and 74.9% $CH_4$ | 38 | 905 | 0.55 | 13 | 5.6 | 24 | 2.3 | 10 |
| 20.5% $H_2S$, 3.9% $CO_2$, and 75.6% $CH_4$ | 38 | 300 | 0.85 | 22 | 13 | 26 | 1.7 | 15 |
| | | 605 | 0.71 | 17 | 10 | 24 | 1.7 | 14 |
| | 54 | 300 | 0.98 | 22 | 12 | 22 | 1.8 | 11 |
| | | 575 | 0.87 | 18 | 10 | 21 | 1.8 | 11 |
| Pure-gas check AFTER completing $H_2S/CO_2/CH_4$ mixture tests . . . | | | | | | | | |
| Pure $CH_4$/Pure $CO_2$ | 50 | 300 | 0.98$^a$ | 42$^a$ | — | 43$^a$ | — | — |
| | 35 | | 0.67$^b$ | 29$^b$ | — | 43$^b$ | — | — |

Module specifications (from Chevron): Number of fibers = 3; Fiber diameter = ~260 μm; Active fiber length = 12.5 cm
Effective module membrane area = 3.08 cm$^2$
7 mixture tests: Shell-side feed; Permeate pressure = psig; Stage-cut <1.2%; Feed flow rate = 244-256 cm$^3$/min; No downstream sweep gas used; Flow rates measured by bubble flowmeter
$^a$Measured immediately (on the same day) at 50° C. after completion of the last $H_2S$ mixture test (which was performed with the 20.5% $H_2S$ mixture at 54° C. and 300 psig) and after minimal purging of module with inert nitrogen.
$^b$Repeated pure-gas check at 35° C. about 5 days after collecting the final $H_2S$ mixture data point and after thoroughly purging the module with inert nitrogen.

Example 8

Design Considerations for Crosslinked Polyimide Polymer Hollow Fibers

The higher permeance and selectivity of the crosslinked polyimide polymer as compared to conventional membranes require optimization of hollow fiber module design in order to maximize the productivity and efficiency of the separation. Optimization of hollow fiber modules with shell-side feed requires (1) minimizing pressure drop in the bore of the fiber and (2) maintaining a high partial pressure driving force along the length of the module.

A counter-current module simulation performed on a membrane module simulator illustrates the design variables, which must be optimized in order to minimize pressure drop in the bore of the fiber and maintain a high partial pressure driving force along the length of the fiber. The calculations during the simulation used a 65 mole % $CH_4$/35 mole % $CO_2$ shell-side feed at 650 psia. The permeate had a pressure of 15 psia. The area of the module was fixed at the number of fibers needed to process 1 MMSCFD with a retentate stream of 23 mole % $CO_2$ at a permeance of 25 GPU. The area was reduced by the ratio of the permeance increase (i.e. if area=A at 25 GPU, area=A/4 at 100 GPU).

Figure 5:
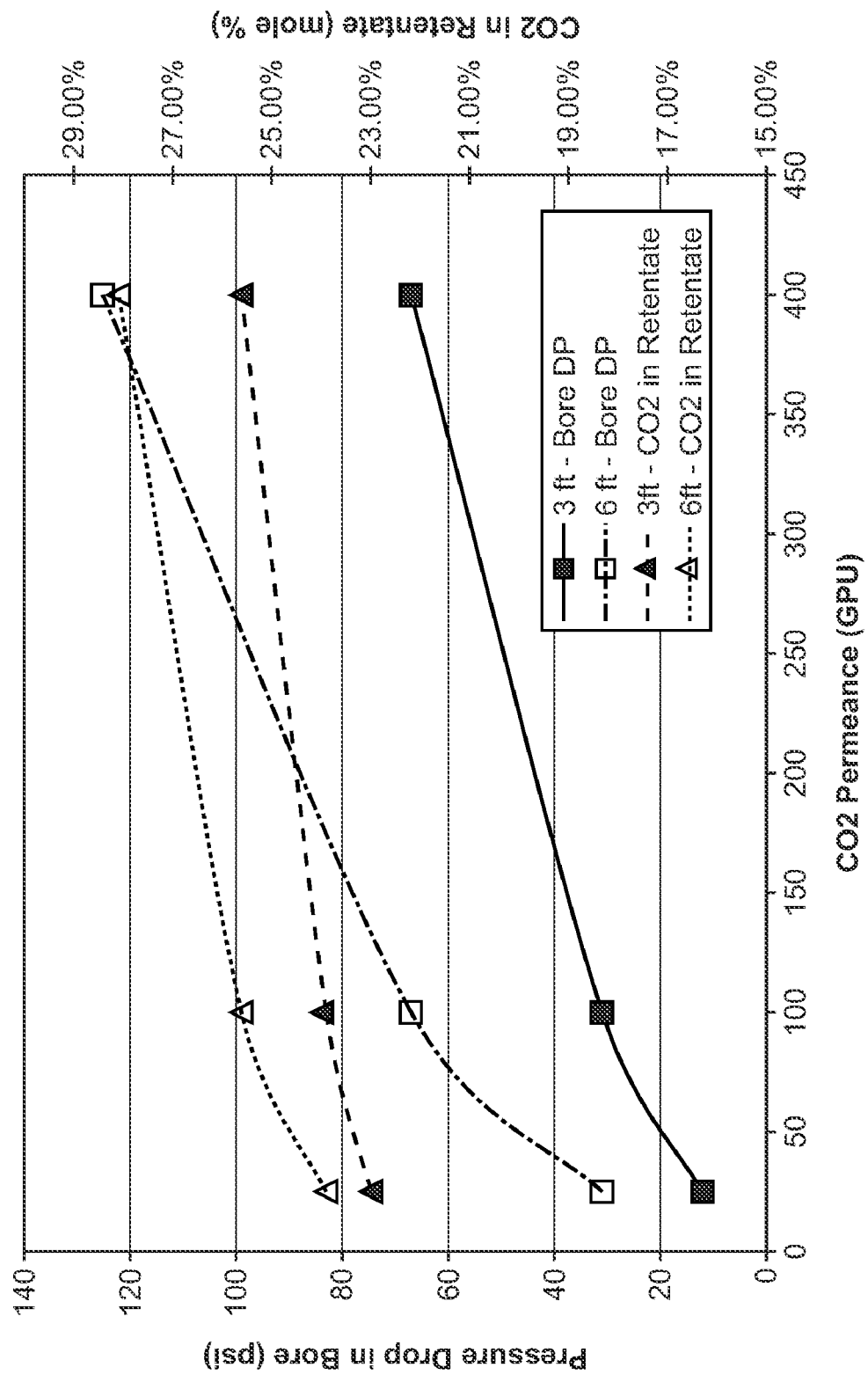
FIG. 5 plots the pressure drop in the fiber bore and $CO_2$ concentration in the retentate for a 3 foot module and a 6 foot module for a $CO_2/CH_4$ selectivity of 35 as a function of $CO_2$ permeance.

The graph in FIG. 5 plots the pressure drop in the fiber bore and $CO_2$ concentration in the retentate for a 3 foot module and a 6 foot module for a $CO_2/CH_4$ selectivity of 35 as a function of $CO_2$ permeance. The graph illustrates that increased permeance increases pressure drop in the bore of the fiber and increased fiber length increases the amount of $CO_2$ in the retentate, both which are undesirable. The graph further shows that the 6 foot module produces a poorer separation (higher $CO_2$ in the retentate) due to the higher pressure drop. Accordingly, the fiber length must be optimized. Pressure drop in the bore of the fiber can be reduced or eliminated by the use of short module length or permeate collection at both ends of the fiber, which effectively reduces the module length.

Figure 6:
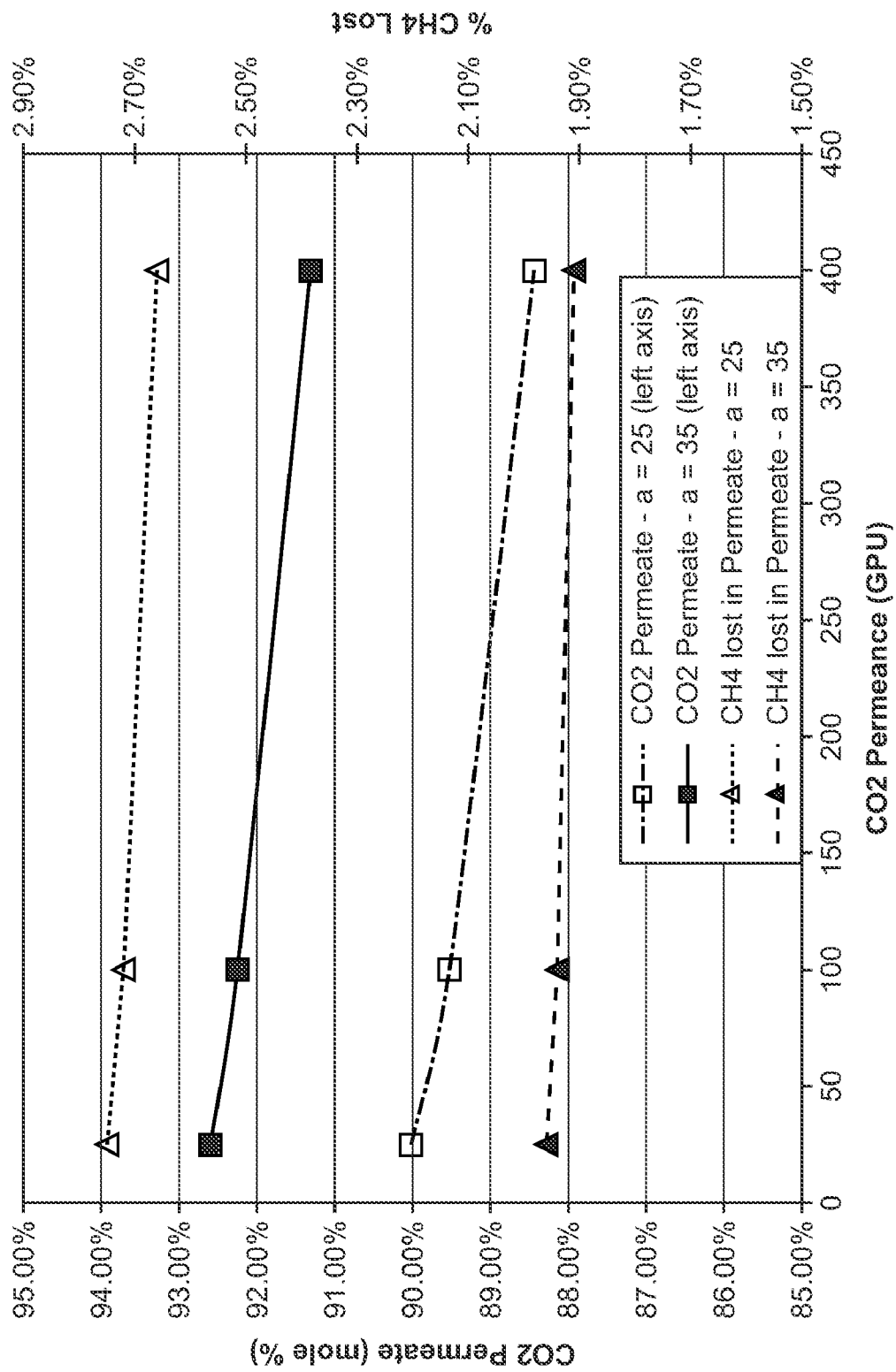
FIG. 6 plots $CO_2$ permeance versus $CH_4$ lost in the permeate. As shown in the graph, decreasing the $CO_2$ selectivity over $CH_4$ in the simulation to 25 results in very similar membrane areas (less than 1% higher); however, as expected, the concentration of $CO_2$ in the permeate is decreased and $CH_4$ lost in the permeate stream is increased.

As shown in the graph in FIG. 6, decreasing the $CO_2$ selectivity over $CH_4$ in the simulation to 25 results in very similar membrane areas (less than 1% higher); however, as expected, the concentration of $CO_2$ in the permeate is decreased and $CH_4$ lost in the permeate stream is increased. There is minimal effect of change of permeance for a membrane of given selectivity as shown in the graph in FIG. 6.

Figure 7:
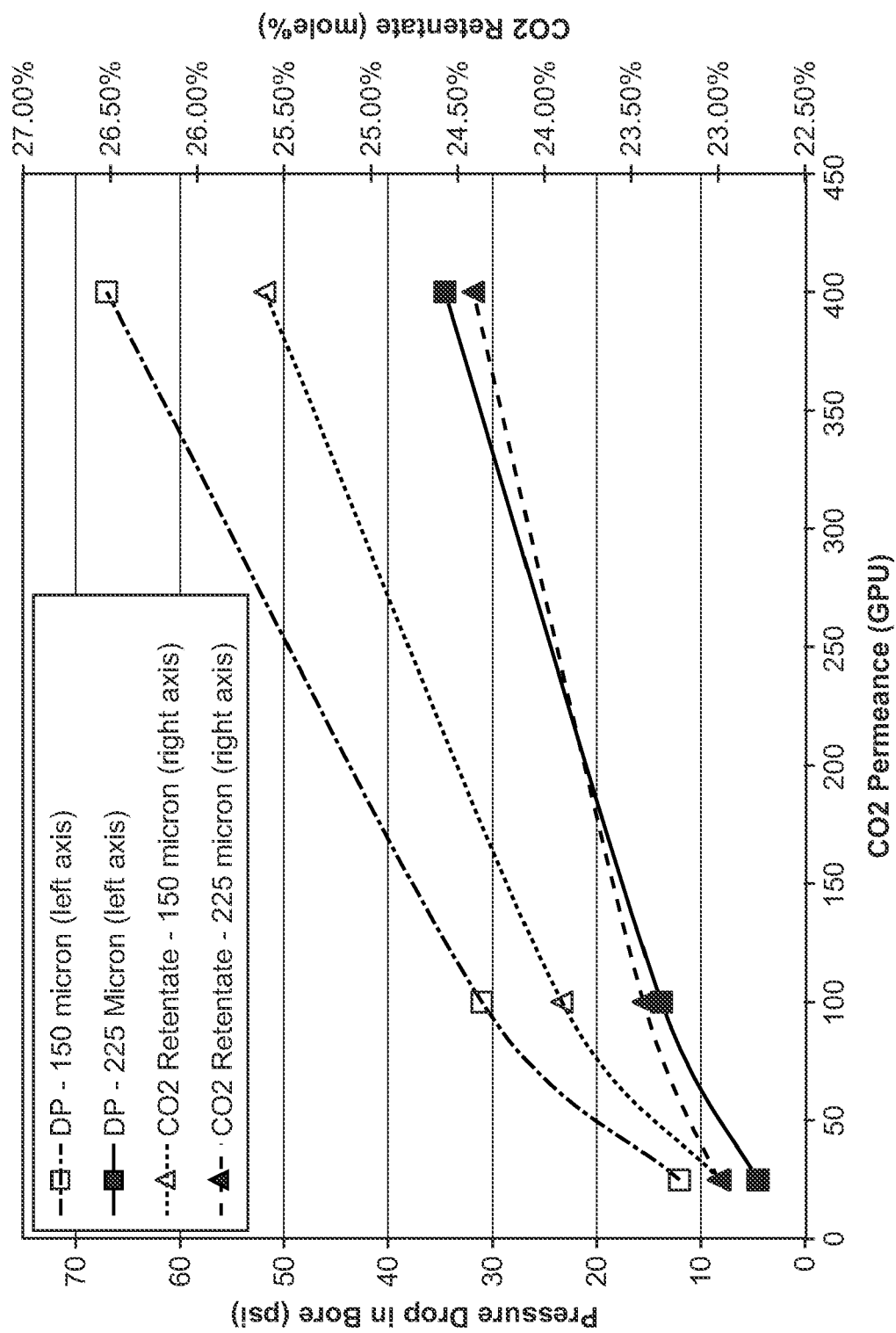
FIG. 7 plots the pressure drop in the fiber bore and $CO_2$ concentration in the retentate for a 150 μm fiber bore diameter and a 225 μm fiber bore diameter for a 3 foot module as a function of $CO_2$ permeance. The graph illustrates that increased permeance increases pressure drop in the bore of the fiber and decreased fiber bore diameter increases pressure drop in the bore of the fiber.

The graph in FIG. 7 plots the pressure drop in the fiber bore and $CO_2$ concentration in the retentate for a 150 µm fiber bore diameter and a 225 µm fiber bore diameter for a 3 foot module as a function of $CO_2$ permeance. The graph illustrates that increased permeance increases pressure drop in the bore of the fiber and decreased fiber bore diameter increases pressure drop in the bore of the fiber. Thus, fiber bore diameter has a strong effect on the permeate pressure drop. This is undesirable. With increased pressure drop, the efficiency of separation is reduced as demonstrated by the increase in $CO_2$ in the retentate. Accordingly, the fiber bore diameter must be optimized. Pressure drop in the bore of the fiber can be reduced or eliminated by using fibers with larger bore diameters.

Pressure drop in the bore of the fiber can also be reduced or eliminated by the use of bore-side feed. Thundyil, M. J., "Characterization, analysis and modeling of non-ideal effects in polymeric membrane-based natural gas processing" *Chemical Engineering*, 1998, University of Texas at Austin.

The enhanced permeance of the hollow fibers of crosslinked polymer necessitates module design considerations that change with feed pressure, feed composition, and $CO_2$ recovery. In a case where $CO_2$ is a recovered product (e.g. for use in EOR), the fixed permeate concentration of $CO_2$ (e.g. 95 vol %) is the parameter controlling the economics of the process.

Example 9

Application in Enhanced Oil Recovery

A simulation using AspenTech Hysys 2006 with membrane extension software was conducted assuming a single stage membrane unit and a minimum $CO_2$ concentration of 95 vol % in the permeate for Enhanced Oil Recovery (EOR). The simulation assumed binary ($CO_2$ and $CH_4$) feed flow of 250 MMSCFD at 100 degrees F. and 650 psia. During the first set of runs depicted in the graphs in Table 10 below, the simulation further assumed a $CO_2/CH_4$ selectivity ($\alpha$) of 35, a fiber outer diameter of 250 µm, a fiber inner diameter of 125 µm, and $CO_2$ permeances of 25 GPU and 100 GPU, respectively. During the second set of runs depicted in the graphs in Table 11 below, the simulation further assumed a $CO_2/CH_4$ selectivity ($\alpha$) of 35, a fiber outer diameter of 500 µm, a fiber inner diameter of 250 µm, and $CO_2$ permeances of 25 GPU and 100 GPU, respectively.

Analysis of the effect of module length on $CO_2$ recovery is shown in the graphs in Table 10 below. The modeled results suggest lower $CO_2$ recoveries for increasing module lengths for the crosslinked polyimide polymer membranes. The range of recoveries for a given feed $CO_2$ concentration broadens further as the permeance of the fibers is increased. Further, with increasing fiber permeance and module length, increasing $CO_2$ concentration is required in the feed to meet the EOR $CO_2$ concentration specification.

Figure 8:
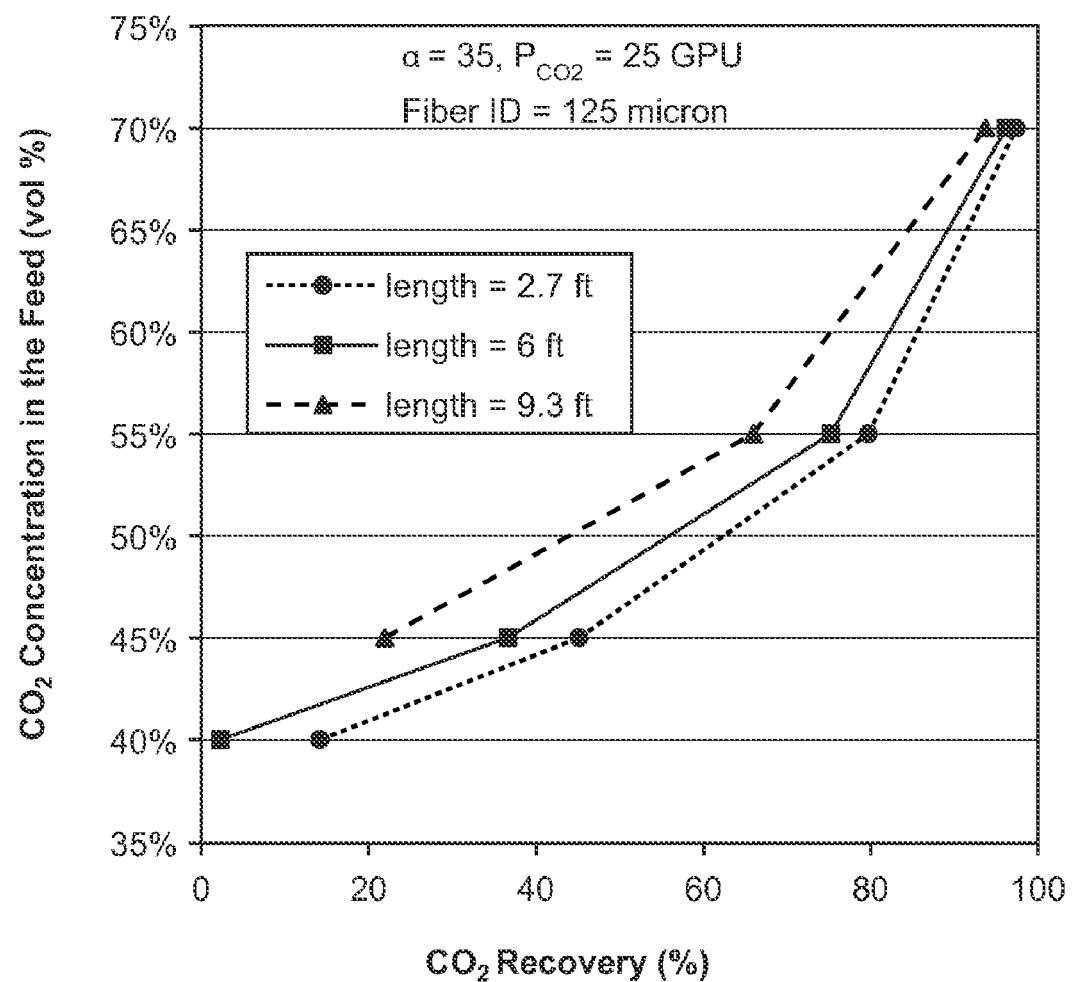
FIG. 8 plots $CO_2$ concentration in the feed versus $CO_2$ recovery.
Figure 9A:
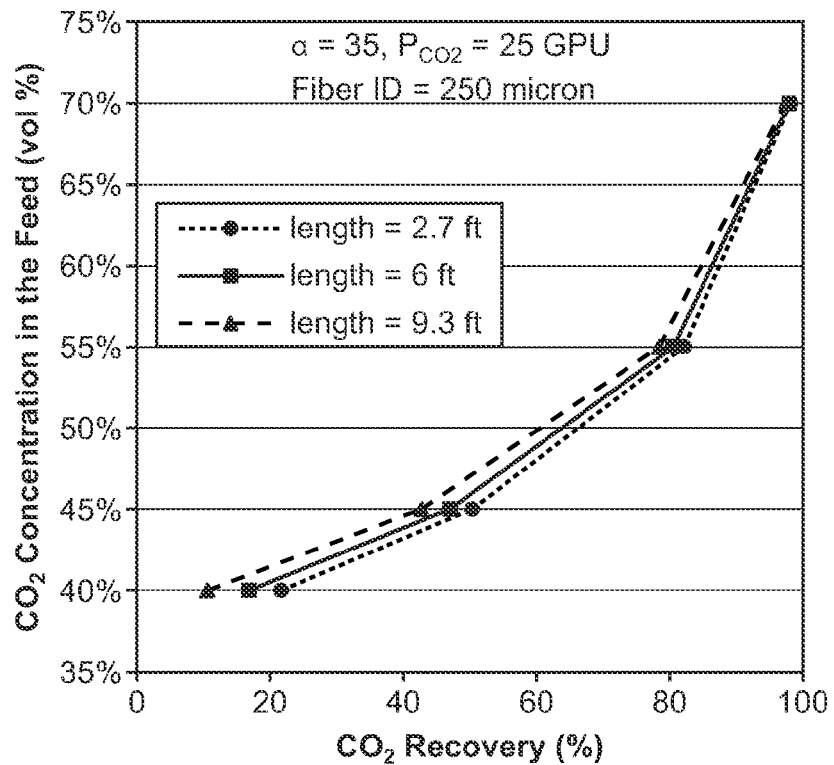
FIG. 9 also plots $CO_2$ concentration in the feed versus $CO_2$ recovery, and as such, provides an analysis of the effect of fiber bore diameter on $CO_2$ recovery.
Figure 9B:
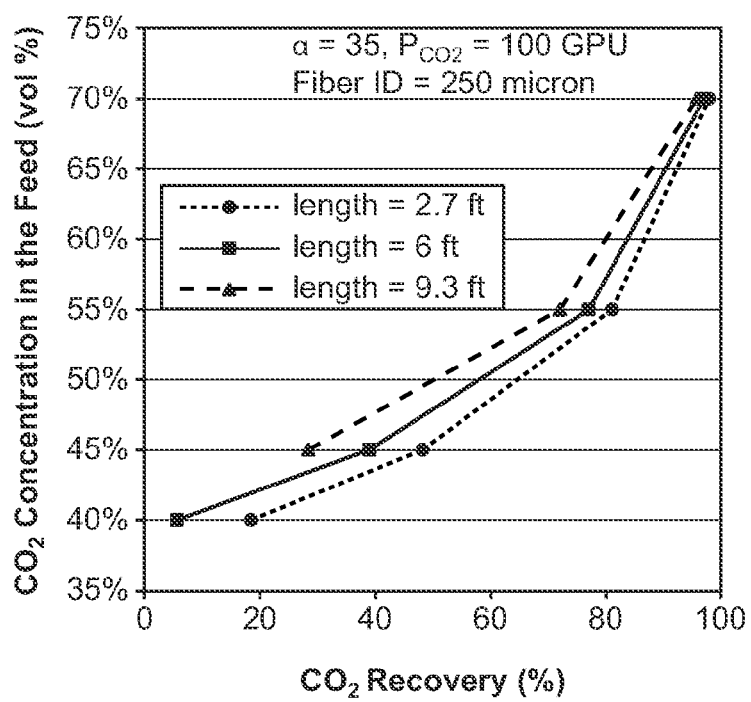

Analysis of the effect of fiber bore diameter on $CO_2$ recovery is shown in the graphs in FIGS. 8 and 9. The modeled results suggest higher $CO_2$ recoveries for increasing fiber bore diameters for the crosslinked polyimide polymer membranes. Due to the larger bore size, the range of $CO_2$ recoveries for a given feed $CO_2$ concentration is tighter as the pressure drop in the fibers is reduced.

The graphs in FIGS. 8 and 9 highlight the importance of controlling pressure drop in the fiber bore by optimizing fiber bore diameter and module length to obtain efficient separations.

For conventional membranes, with a $CO_2/CH_4$ selectivity of 15 and a permeance of 25 GPU, similar trends were obtained. However, due to the lower selectivity, with the single stage membrane unit, a much higher $CO_2$ concentration (greater than 55 vol %) was required in the feed stream to obtain a permeate having a minimum $CO_2$ concentration of 95 vol % compared to the crosslinked polyimide polymer membranes. Also, the $CO_2$ recoveries were lower compared to the crosslinked polyimide polymer membranes. Thus, the crosslinked polyimide polymer membranes can be used in a single stage membrane unit for EOR applications for a wider range of $CO_2$ feed concentrations as compared to conventional membranes with lower selectivities.

Although the present processes and apparatus have been described in connection with specific embodiments thereof, it will be appreciated by those skilled in the art that additions, deletions, modifications, and substitutions not specifically described may be made without departing from the spirit and scope of the processes and apparatus as defined in the appended claims.

That which is claimed is:

1. A process for producing a $CO_2$-depleted product gas stream, comprising:
    feeding a natural gas feed stream comprising water vapor and greater than about 10 vol % $CO_2$ to at least one membrane unit comprising a plurality of polymer membranes to provide a $CO_2$-rich permeate comprising at least 95 vol % $CO_2$ and a $CO_2$-depleted product gas stream, the polymer membranes comprising a crosslinked polyimide polymer having covalent ester crosslinks and having a $CO_2$ permeance of at least 20 GPU and a $CO_2/CH_4$ selectivity of greater than 20, at 35 degrees C. and a feed pressure of 100 psia.

2. The process according to claim 1, wherein the natural gas feed stream comprises greater than about 15 vol % $CO_2$.

3. The process according to claim 1, wherein the $CO_2$-depleted product gas stream comprises between about 50 ppmv and about 23 vol % $CO_2$.

4. The process according to claim 1, wherein the $CO_2$-depleted product gas stream has a heating value between about 300 BTU/scf and about 1500 BTU/scf.

5. The process according to claim 1, wherein the crosslinked polyimide polymer has a ratio of crosslinkable sites to imide groups of between 3:8 and 1:16.

6. The process according to claim 1, wherein the crosslinked polyimide polymer is made from the monomers A+B+C, where A is a dianhydride of the formula:

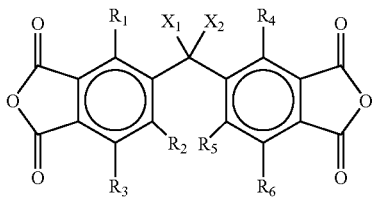

$X_1$ and $X_2$ are the same or different halogenated alkyl, phenyl or halogen;

$R_1$, $R_2$, $R_3$, $R_4$, $R_5$, and $R_6$ are H, alkyl, or halogen;

B is a diamino cyclic compound without a carboxylic acid functionality;

C is a diamino cyclic compound with a carboxylic acid functionality; and wherein the ratio of B to C is between 1:4 and 8:1.

7. The process according to claim 1, wherein the natural gas feed stream comprises between about 15 vol % and about 80 vol % $CO_2$.

8. The process according to claim 1, further comprising a step selected from the group consisting of venting the $CO_2$-rich permeate to the atmosphere, reinjecting the $CO_2$-rich permeate, sequestering the $CO_2$-rich permeate, and combinations thereof.

9. The process according to claim 1, wherein the at least one membrane unit is located at a remote, offshore location and further comprising forwarding the $CO_2$-depleted product gas stream through a pipeline to an onshore location.

10. The process according to claim 1, wherein the at least one membrane unit comprises a first stage membrane unit and a second stage membrane unit.

11. The process according to claim 10, further comprising:
feeding the natural gas feed stream to the first stage membrane unit to provide a first permeate stream and the $CO_2$ depleted product gas stream;
feeding the first permeate stream to the second stage membrane unit to provide the $CO_2$-rich permeate and a second retentate stream; and
combining the second retentate stream with the natural gas feed stream prior to feeding the natural gas feed stream to the first stage membrane unit.

12. The process according to claim 1, wherein the natural gas feed stream is fed to the at least one membrane unit at a flow rate of between about 10 million scf/day and about 1 billion scf/day.

13. The process according to claim 6, wherein A is 4,4'-(hexafluoroisopropylidene)diphthalic anhydride (6FDA), B is 2,4,6-trimethyl-m-phenylenediamine (DAM), and C is 3,5,-diaminobenzoic acid (DABA).

14. The process according to claim 13, wherein the ratio of DAM to DABA is 3:2.

15. The process according to claim 1, wherein the plurality of polymer membranes are hollow fiber membranes.

16. The process according to claim 1, wherein the plurality of polymer membranes are composite polymer membranes.

17. The process according to claim 1, wherein the natural gas feed stream comprises greater than about 10 vol % $CO_2$ and $H_2S$ and the $CO_2$-rich permeate further comprises $H_2S$.

18. A process for producing a $CO_2$-depleted product gas stream, comprising:
feeding a natural gas feed stream comprising water vapor and greater than about 10 vol % $CO_2$ to at least one membrane unit comprising a plurality of polymer membranes to provide a $CO_2$-rich permeate comprising at least 95 vol % $CO_2$ and a $CO_2$-depleted product gas stream, the polymer membranes comprising a crosslinked polyimide polymer having covalent ester crosslinks and having a $CO_2$ permeance of at least 20 GPU and a $CO_2/CH_4$ selectivity of greater than 20, at 35 degrees C. and a feed pressure of 100 psia; and
feeding the $CO_2$-depleted product gas stream to an amine unit to provide a $CO_2$-rich product from the amine unit and a second $CO_2$-depleted product gas stream,
wherein the natural gas feed stream originates from a subsea gas reserve and the amine unit is located at an onshore location.

19. The process according to claim 18, wherein the at least one membrane unit is located at the onshore location or at a remote, offshore location.

20. The process according to claim 19, wherein the remote, offshore location is a fixed, floating platform; a mobile, floating facility; or subsea.

21. The process according to claim 18, further comprising reinjecting or sequestering $CO_2$-rich product from the amine unit.

22. The process according to claim 1, wherein the natural gas feed stream is water vapor saturated.

23. The process according to claim 18, wherein the natural gas feed stream is water vapor saturated.

* * * * *